United States Patent [19]

Sibley

[11] Patent Number: 4,472,789

[45] Date of Patent: Sep. 18, 1984

[54] VITAL TIMER

[75] Inventor: Henry C. Sibley, Adams Basin, N.Y.

[73] Assignee: General Signal Corporation, Stamford, Conn.

[21] Appl. No.: 304,093

[22] Filed: Sep. 21, 1981

Related U.S. Application Data

[63] Continuation-in-part of Ser. No. 092,967, Nov. 9, 1979, abandoned.

[51] Int. Cl.[3] .......... G06F 1/04; G06F 11/08; G06F 9/00

[52] U.S. Cl. .......... 364/900; 371/62; 364/569; 328/131.1; 328/138; 377/39; 377/107

[58] Field of Search .......... 371/61, 62; 364/200 MS File, 900 MS File, 484, 569, 701; 328/129, 131, 138; 377/52, 39, 107; 340/825.18, 825.66

[56] References Cited

U.S. PATENT DOCUMENTS

| | | | |
|---|---|---|---|
| 3,418,637 | 12/1968 | Humphrey | 364/900 |
| 3,566,368 | 2/1971 | Blauw | 364/200 |
| 3,723,975 | 3/1973 | Kurtz, Sr. et al. | 364/200 |
| 4,090,173 | 5/1978 | Sibley | 371/52 |
| 4,158,432 | 6/1979 | Van Bavel | 364/900 |
| 4,169,526 | 9/1979 | Auer, Jr. et al. | 364/569 |
| 4,181,849 | 1/1980 | Sibley | 364/900 |
| 4,307,463 | 12/1981 | Sibley | 371/14 |
| 4,368,534 | 1/1983 | Sibley | 371/53 |

*Primary Examiner*—Eddie P. Chan
*Attorney, Agent, or Firm*—Oblon, Fisher, Spivak, McClelland & Maier

[57] ABSTRACT

A vital timer for energizing a vital relay at the end of a preselected time interval generated by a vitally programmed microprocessor. Diverse time data words of the preselected time interval are generated, loaded into diverse registers within the microprocessor, and are incremented by means of a program loop for the duration of the time interval determined by the magnitude of the diverse time data words. The microprocessor includes checking routines for verifying that the selected time interval has correctly been read, that a microprocessor primary clock bears a predetermined relationship to an external auxiliary clock, and that the diverse registers maintain a predetermined count relationship for the duration of the preselected time interval. Checking routines produce plural predetermined checkwords indicative of vital timer performance, which checkwords are utilized to address an output program formed of groups of instructions each corresponding to a respective checkword, and each of which must be accessed in predetermined sequence in order to produce a predetermined time varying output to the tuned vital relay driver. Thus, the tuned vital relay driver is activated only in the event that each prescribed checkword is generated to verify failure free timer performance.

53 Claims, 15 Drawing Figures

SET TIMER SUBROUTINE

TEST OUTPUT BIT

CLOCK CHECK

TIME SELECTOR READING ROUTINE - DIRECT

VITAL COUNTING ROUTINE

VITAL COUNTING ROUTINE - DETAIL

VITAL OUTPUT PROGRAM SEGMENTS

VITAL TIMER

CROSS REFERENCE TO RELATED APPLICATIONS

This application is a continuation in part of U.S. application Ser. No. 092,967 filed Nov. 9, 1979, now abandoned.

BACKGROUND OF THE INVENTION

1. Field of the Invention

This invention relates to a vital timer for energizing an output relay at the end of a preselected time interval. Also, the invention relates to my related inventions disclosed in U.S. Pat. Nos. 3,995,173, 4,090,173, 4,181,849 and 4,234,870, and my copending U.S. applications Ser. No. 157,658 filed June 9, 1980, now U.S. Pat. No. 4,368,534, Ser. No. 007,184 filed Jan. 29, 1979, now abandoned, and Ser. No. 119,655 filed Feb. 8, 1980, now U.S. Pat. No. 4,307,463 the disclosures of which are hereby incorporated by reference herein.

2. Description of the Prior Art

In the rail industry, it is often necessary to activate an output device a predetermined time interval after the occurrence of a particular event. For example, it may be desired to open the doors of a passenger car a predetermined time after the car has come to a stop. For this application, it is critically important that the output relay controlling the opening of the passenger car doors is not prematurely activated if the safety of the rail system is not to be compromised.

Aside from the application to the opening of the doors of a rail car, there are numerous other instances in which it is desired to activate an output device after the passage of a predetermined time period, and only after the time period has in fact expired. This is true from the electronic controls provided for rail switching and signaling, and virtually any application where safety is a prime consideration.

In the past, mechanical means have been used to perform the necessary timer function, and motor time element relays have long been used in the rail industry. While the mechanical timers have been suitable for many purposes, they exhibit relatively limited programmability and therefore have a relatively limited performance range. Furthermore, while the accuracy of the mechanical timers has been adequate for many applications, in other instances where high accuracy is a requirement, it is necessary to find alternate means for generating the time interval. Thus, as the rail industry in particular rushes into the electronic age, it is desirable to develop a reliable, safe and relatively inexpensive electronic replacement for the mechanical timer of the past.

Recently, attempts have been made abroad to apply computer techniques to fulfill the function of a vital timer. While the details are somewhat sketchy at this time, the general approach seems to be to utilize completely redundant mini-computers produced by different manufacturers and programmed by different programming teams to process redundantly the vital timer time interval and then activate an output device only in the event that the redundant mini-computer systems are in agreement as to the time of activation. The prevailing wisdom is that if you have different programming teams providing different programs for different computers, the likelihood of a common failure is slim and represents an acceptable risk. Nevertheless, since this technique of employing independently redundant mini-computer systems makes no provision for internal checking of the processing of either system, a fatal combination of failures is a distinct possibility. Furthermore, the independent redundancy concept necessarily entails considerable recurring and non-recurring costs to bring these systems to market, which represents a further compromise in the utility of that approach.

SUMMARY OF THE INVENTION

Accordingly, one object of this invention is to provide a novel vital timer for energizing an output relay at the end of a preselected time interval, in which activation of the output relay is reliably done only after the expiration of the time interval.

Another object of this invention is to provide a novel vital timer wherein in the event of a failure such as a momentary interruption of power, the time interval may be increased but never shortened.

A further object of this invention is to provide a novel vital timer of the type described above, in which the time interval can easily be set over a wide performance range.

Yet another object of this invention is to provide a novel vital timer employing digital processing techniques including internal software and hardware cycle checking to verify failure-free time select data entry, processing, and output generation.

Another object of this invention is to provide a novel vital timer characterized by digital display of timing progress, and/or fault conditions.

A further object of this invention is to provide a novel vital timer exhibiting improved timing accuracy.

Another object of this invention is to provide a novel vital timer in which cycle checking and diversity are keynote features.

These and other objects are achieved according to the invention by providing a novel vital timer which includes a matrix selector switch for establishing the timing interval, and a digital processor for scanning the matrix selector switch, converting the switch settings to time select data, generating a time interval corresponding to the selected time presented by the time select data, and energizing an output device at the end of the selected time interval.

The integrity of the digital processor is checked during each of the vital tasks performed thereby by a combination of techniques, including cycle checking and diversity within each task, and general tests performed on processor clock, memory, and I/O. To that end, the digital processor of the invention includes a primary clock, an auxiliary clock, diverse data entry means clocked by the primary clock for forming diverse time data based on a time base clock equalling multiple cycles of the primary clock, and diverse counting registers in which the diverse time data words are loaded, and which are subsequently alternately incremented by the time base clock for the period of the preselected time interval.

The digital processor is further provided with checking routines verifying that the time select data has correctly been read, that the time base clock has a period extending a predetermined number of cycles of the auxiliary clock, and that the diverse registers diversely count the time base clocks during the preselected time interval in a predetermined sequence. To that end, the checking routines produce plural predetermined checkwords indicative of the vital time performance, and store these checkwords in a memory. Stored in another memory of the digital processor is an output program organized as groups of output instructions, each of which is addressable either directly or indirectly, depending on the selected hardware, based on a predetermined checkword. The groups of output instructions are stored in a predetermined order, with each group separated from any other group by a lock-up instruction, or optionally a test jump instruction returning operation to an earlier program segment to repeat the checking routines, which precludes output activation in the event that the groups of output instructions are not addressed in a predetermined sequence. In an indirect output instruction addressing program designed for use with an Intel 8748 microprocessor integrated circuit, all of the checkwords stored in the checking memory are converted into key numbers by means of a key table, with the key numbers then being used to access respective output program instruction groups to produce the output signal for activation of the output device.

The checking routines of the digital processor of the invention test the vital driver output test instruction, purge and test the data memory, verify the accuracy of the primary clock by means of the auxiliary clock, monitor and verify data entry, and otherwise assure failure-free performance of the vital timer of the invention.

The vital timer of the invention is further provided with a decimal display of the amount of time remaining in the selected time interval before activation of the output device, and also a second display indicating the passage of each second of the time interval. Advantageously, the display of the invention can further be utilized to indicate fault conditions in the event that a failure is detected.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 3A, 3B, 3C, 4A, 4B, 4C, 5A, 5B, 6A, 6B, 6C, 7 and 8 are flow charts illustrative of timer operation, wherein FIGS. 3A, 3B and 3C are flow charts illustrating the overall vital timer program, FIGS. 4A and 4B are flow charts illustrative of the clock check subroutine of the invention, FIG. 4C is a flow chart of the subroutine for checking the output bit according to the invention, FIGS. 5A and 5B are flow charts of program segments for forming diverse time data words during time data selection according to the invention, FIGS. 6A, 6B and 6C are flow charts of the time data counting subroutine of the invention, FIG. 7 is a flow chart illustrative of one of several similar subroutines employed in the time data counting subroutine for checking counting register correspondance according to the invention, and FIG. 8 is a flow chart illustrative of the output program segments according to the invention.

DESCRIPTION OF THE PREFERRED EMBODIMENTS

Figure 1:
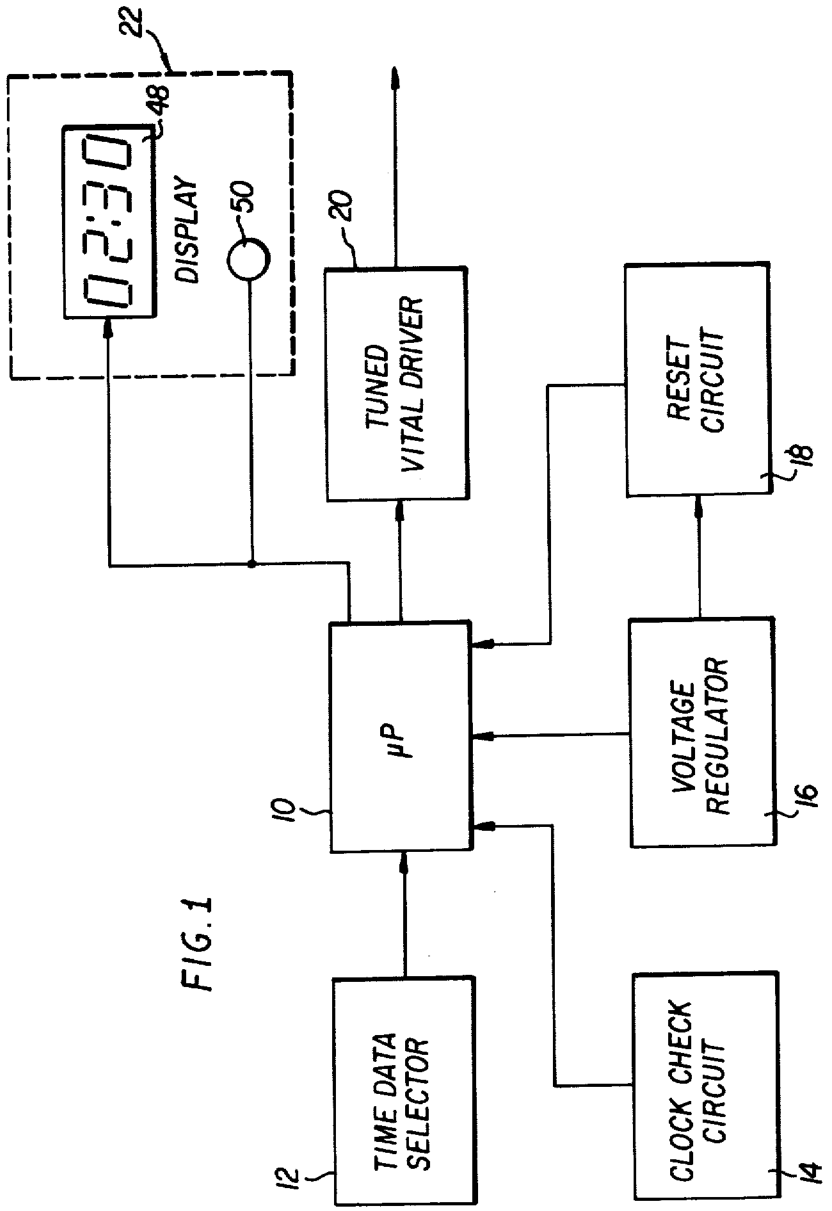
FIG. 1 is a block diagram of the vital timer of the invention.

Referring now to the drawings, wherein like reference numerals designate identical or corresponding parts throughout the several views, and more particularly to FIG. 1 thereof, the vital timer of the invention is seen to include a digital processor 10, a time selector 12, a clock check circuit 14, voltage regulator 16, reset circuit 18, tuned vital driver 20, and display 22.

Figure 3A:
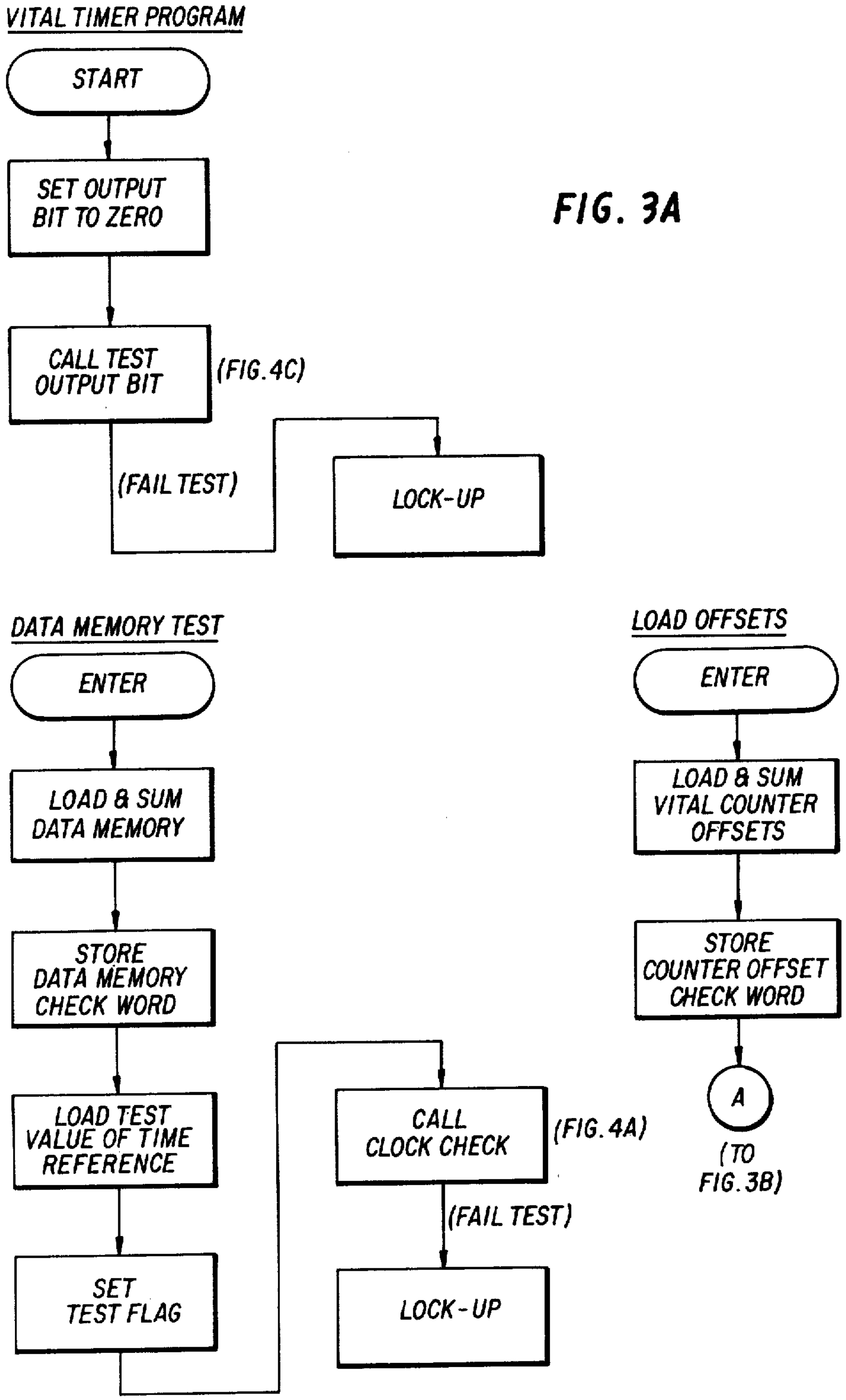
Figure 3B:
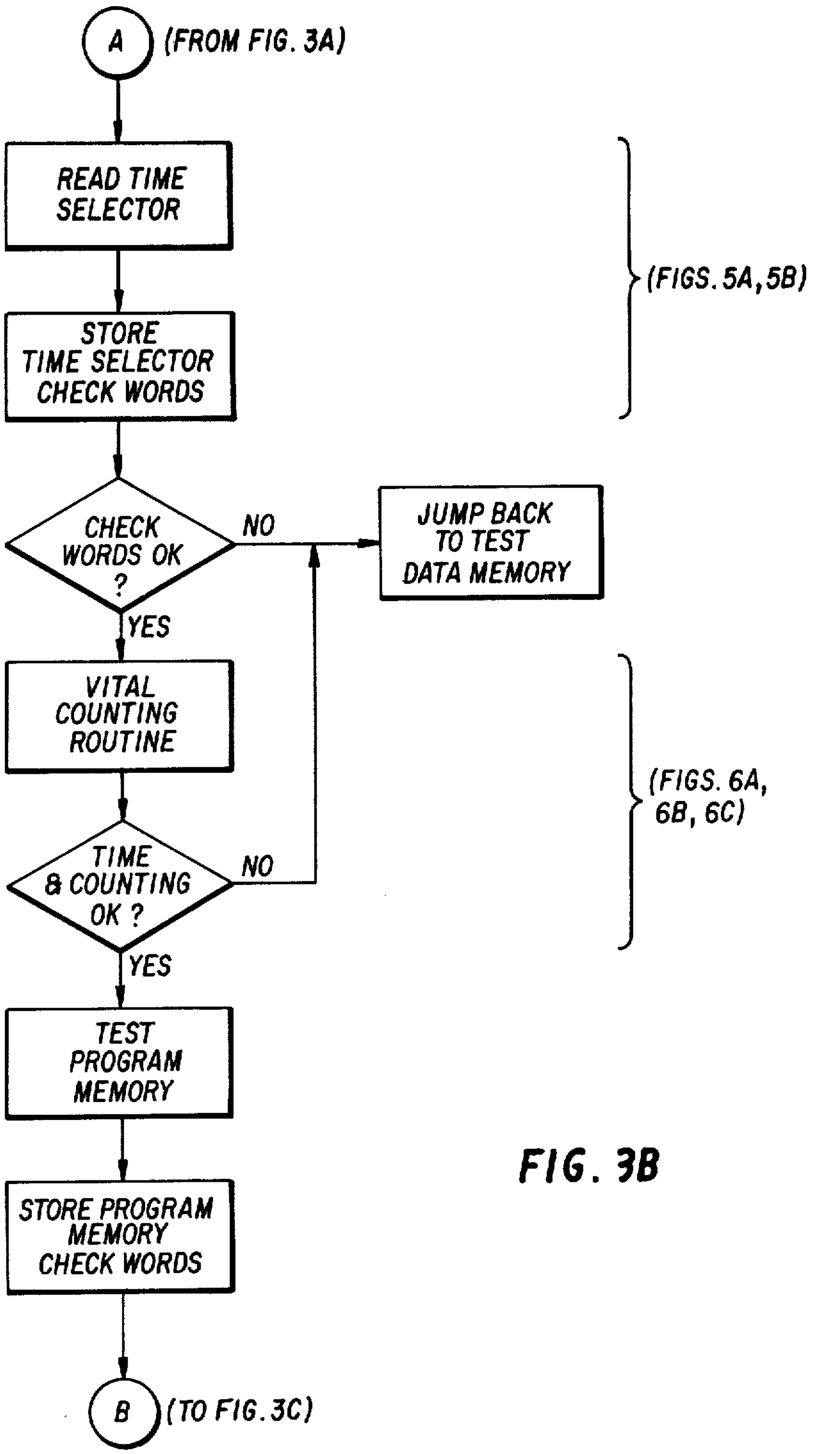
Figure 3C:
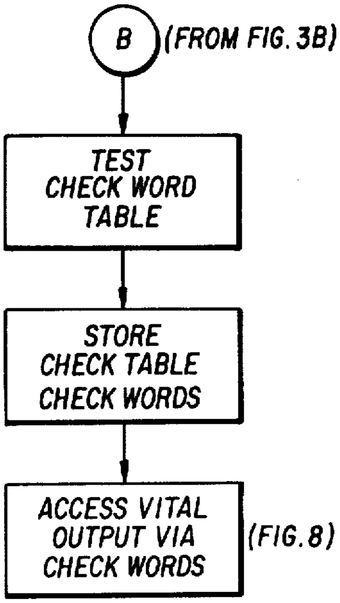

The digital processor 10 can be implemented using an Intel single chip microprocessor type 8748 which performs the vital timing logic. Internal to the microprocessor 10 are plural registers utilized for counting purposes, including registers for generating a time base clock of 0.040 milliseconds and data registers clocked by the time base clock to count a number of cycles of the time base clock equal to a preselected time interval manually selected by means of the time selector 12. The microprocessor 10 further internally includes plural memories including a memory for storing checkwords, a memory containing plural groups of output instructions for generating a 10 Khz signal for driving the tuned vital driver 20, and various other table memories utilizing the checking routines, as shown in FIGS. 3A, 3B and 3C for verifying failure-free microprocessor performance, as described in more detail hereinafter.

Since the vital timer of the invention is intended to replace the conventional time element relays presently used in the rail industry, which typically provide an output a preselected time period after application of power thereto, and since the vital timer of the invention is to be a direct mechanical and electrical replacement, a feature of the vital timer of the invention resides in initiation of the preselected time interval upon application of power thereto. For that purpose, the voltage regulator 16 of the invention, shown in more detail in FIG. 2, applies voltage not only to the microprocessor 10, but also to the reset circuit 18, which includes a relaxation oscillator formed by capacitor 24, resistor 26, and inverter 28, connected to the $\overline{\text{RESET}}$ input terminal of microprocessor 10. The reset circuit 10 further includes an inverter 30 connected in series with capacitor 32, resistor 34, buffer amplifier 36, and resistor 38. At the junction between capacitor 32 and resistor 34 is connected resistor 40, the other side of which is connected to the five volt regulated output of the voltage regulator 16. The input to the inverter 30 is connected to the output of one stage of a buffer hex latch 42 having inputs connected to an I/O port 44 of the microprocessor 10. The hex latch 42 serves as an expander port for the microprocessor 10 and is clocked by a PROG signal output by the microprocessor at terminal 46. Provision of the hex latch 42 is a way of expanding the I/O capability of the Intel ID 8748 microprocessor selected for use in accordance with the invention.

Figure 2:
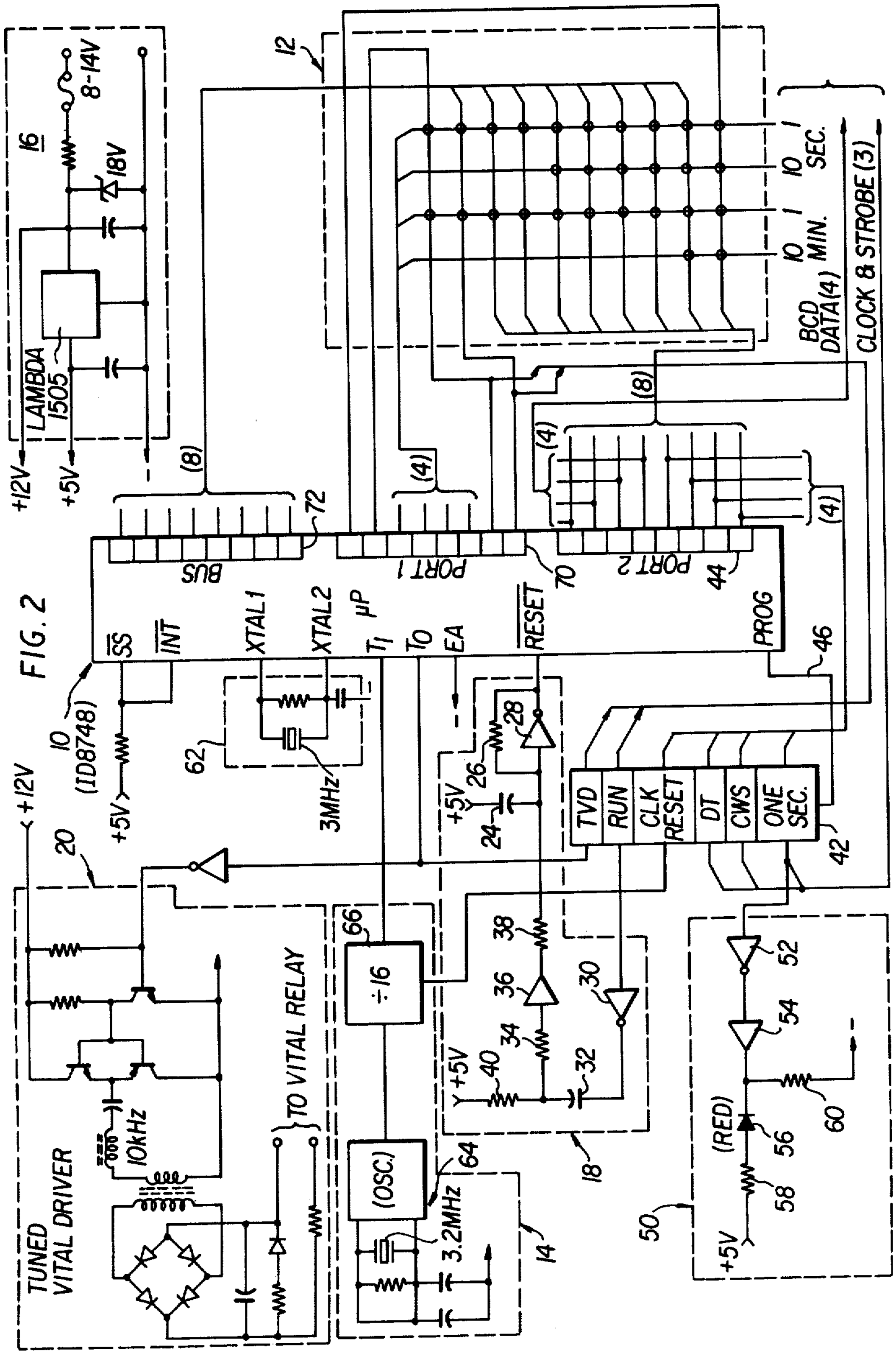
FIG. 2 is a circuit diagram illustrating in more detail the circuit elements of the vital timer of the invention shown in FIG. 1.

The reset circuit 18 operates in conjunction with the voltage regulator 16, which is of conventional design and the details of which are shown in FIG. 2, as follows. Upon application of DC voltage to the input terminals of the voltage regulator, and the generation of a five volt output at the output terminals of the voltage regulator, this five volt output is applied to capacitor 24 of the reset circuit and is momentarily impressed upon the input terminal of inverter 28, causing the output of inverter 28 to be at a logic "0" level, causing reset of the microprocessor 10 for a period determined by the time constant of capacitor 24 and resistor 26, approximately 10 msec. As the capacitor 24 charges, the voltage level at the input to the inverter 28 drops below the threshold of the gate 28, causing the output of the inverter 28 to change state to the logical "1" level. Thereafter, the microprocessor 10 periodically generates a RUN signal which is applied through the expander port 42 to inverter 30, capacitor 32, resistor 34, amplifier 36 and resistor 38 to the junction of the capacitor 24 and the input to the inverter 28, maintaining the input of the inverter 28 at a level below the threshold of the inverter 28. Thus, once voltage is applied to the voltage regulator, the microprocessor 10 is initially reset for the duration of the time constant established by capacitor 24 and resistor 26, and is thereafter enabled for processing of the selected time interval.

The hex latch or expander port 42 is also used for the purpose of applying the appropriate drive signals to the display of the invention. As shown in FIG. 1, the vital timer of the invention includes a conventional display 48 for displaying the amount of time remaining before expiration of the preselected time interval. BCD time data is applied directly to the display 48 via the I/O port 44, while appropriate clocks and strobes to the display 48 are applied thereto via the expander port 42. The display of the invention further includes a pulse lamp display 50 coupled to the expander port 42, which includes the series connection of inverter 52, amplifier 54, LED 56, and resistor 58 connected to the five volt output of the voltage regulator 16. Connected to the junction of the output of the amplifier 54 and the cathode of LED 56 is resistor 60, the other side of which is connected to the low voltage output of the regulator 16. By means of the expander port 42, the LED 56 is periodically pulsed at each second of the preselected time interval to produce a pulsed visual display indicating processing of the preselected time interval.

As noted earlier, the microprocessor 10 is implemented by means of an Intel ID 8748 single chip microprocessor provided with a crystal processor 3 MHz clock source 62. For the purposes of clock checking, a crystal oscillator 64 separate from the processor clock 62, and a frequency divider 66 provide an independent time reference used in vital clock check routines as discussed in detail hereinafter.

The output device to be activated by the vital timer according to the invention in the rail signaling application for which the timer is intended is a vital relay driver tuned to a 10 kHz signal. The vital relay is driven by the tuned vital driver 20 tuned to a 10 kHz frequency and connected to an output terminal T1 of the microprocessor 10. The tuned vital driver 20, which is of conventional design and the details of which are shown in FIG. 2, produces an output to the vital relay only upon the provision of a 10 kHz signal at the input thereof, as produced by the microprocessor 10, after expiration of the preselected time interval and upon verification of failure-free system performance. The tuned relay driver is used for this application because the driver isolates the relay from the DC energy supply by means of a transformer since the vital relay will only be activated if the signal of the correct frequency is applied to the input of the driver 20.

A primary consideration of the time data selector 12 is that it must be safe from changing to a setting different from the one selected as a result of vibration, mechanical failure, or high contact resistance. To that end, the time data selector 12 shown schematically in FIG. 2 is formed of a matrix of horizontal and vertical lines which are interconnectable by means of manually positioned contacts (not shown). Each vertical line is connectable to only a single horizontal line, or to none of the horizontal lines. The selector switch 12 is preferrably constructed of plural single pole switches, one for each digit, and each having a number of settings as required, corresponding to the different values the respective digit must be capable of assuming.

The software for producing a vital product, in this case the vital time interval, must prove the correct operation of all hardware involved in producing a safe output. Furthermore, software must also prove that it has in fact verified correct operation. To that end, the software of the invention utilizes cycle checking and diversity techniques to prove correct operation. Cycle checking is used on individual bits, entire memories, individual instructions, and entire subroutines. Diversity is used when the output of a process can have many values. Basically, if the same output is produced by totally diverse means, that output is accepted. The checking features according to the invention are provided by generating data bytes called checkwords. The checkwords do not exist in processor memory, and they are generated as a result of successful completion of vital software checks. The output relay cannot be energized unless a full complement of correct checkwords has been generated. This is true because the vital output program which generates the 10 kHz signal for the vital relay driver does not exist in the processor until all of the tests and tasks have been completed, and the appropriate checkwords thereby formed in data memory. Then, a further test is performed verifying that all the checkwords previously stored in memory are correct, which results in the production of additional checkwords which are also stored in data memory. The list of checkwords thusly generated comprises the addresses of program instructions which are then accessed to generate the vital output.

The vital timer software performs the following tasks:

read the time data selector switches,
display selected time,
generate selected time interval,
energize the output relay.

Because all the above tasks except the display are vital, these tasks are subject to the following constraint:

energize the output relay only if no unsafe failure has occurred.

The integrity of the processor is checked during each of the vital tasks by a combination of techniques:

cycle checking and diversity within the task period,
general tests performed on processor clock, memory, an input/output.

Figure 4B:
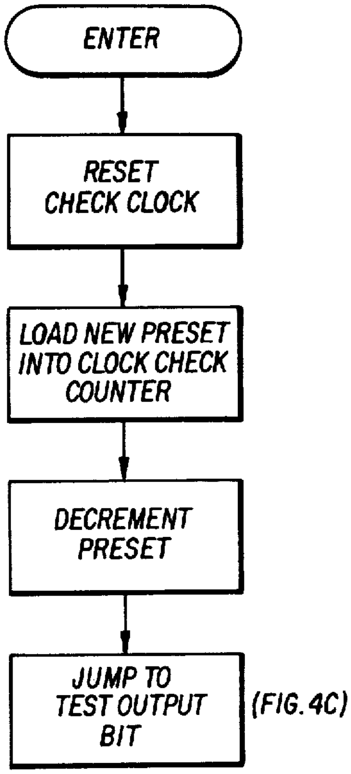
Figure 4C:
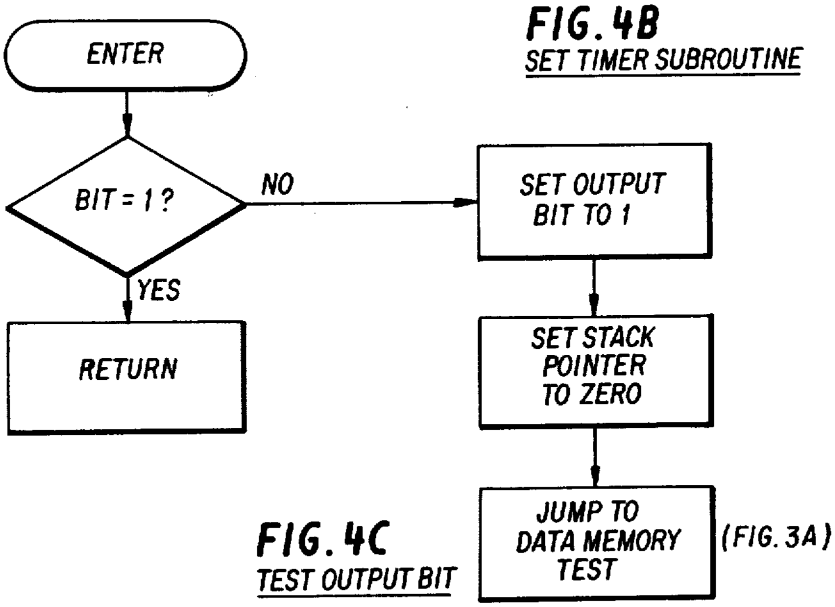

A first general test performed during vital time processing involves verification of the microprocessor output to the tuned vital driver. This test is shown in FIG. 4B and follows the clock check routine of FIG. 4A each time the clock check routine is called during each pass through the program loop for generation of the time base clock. Since the vital relay is to be energized upon production of a 10 kHz output signal applied to the tuned vital driver via the expander port 42, this output bit should be maintained at a constant logic level, for example at a logic "1", at all times except during output of the 10 kHz signal and only after generation of the preselected time interval. Accordingly, the state of the output bit from the expander port 42 is sensed by the TO input to the microprocessor 10. If the TO bit changes state before the time cycle has been completed, the program locks up, leaving the main program. (See FIG. 4B). The hardware and software used in this safeguard are tested during the starting phase of the program by forcing the output to an error state, e.g. logic level "0", and the verifying that the checking routine detects the forced error in much the same way as described with respect to the clock check test.

One of the general tests performed is a data memory test on the data memory of the microprocessor 10. This data memory is a 64-byte read/write register array located internal to the processor. It is used for temporary storage of data generated during the program cycle, including checkwords. It is vital that the contents of this memory be cleared at the start of the program. Therefore, this memory is cleared of all data by loading a set of known (but meaningless to the time program) data into the read/write register array of the data memory. After the data are loaded, they are summed to produce a memory sum checkword which verifies that the test was made and that the memory worked correctly. Furthermore, the amount of time taken in the generation of the memory sum checkword is further indicative of whether or not the routine has been correctly performed. Since the microprocessor 10 is clocked internally, the utilization of the output of the divider 66 employed in the clock check routine, discussed in more detail hereinafter, provides a way of timing the memory sum checkword routine. Thus, outputs from the divider 66 are applied to a counting register internal to the microprocessor 10 for the duration of the generation of the memory sum checkword to produce a second checkword indicative of the time taken during the memory sum checkword generation. This second checkword, called the memory time checkword, is then also stored in the read/write register array forming the data memory of the data processor 10.

It is noted that since the vital timer of the invention is not energized when it is not being used, it is virtually impossible for useful data to remain in the data of the microprocessor 10. However, clearing the data memory at the start of the program execution assures that if the vital timer is restarted during a cycle because of a power interruption or noise, a full timed cycle will be run.

Since time is a vital perameter in the vital timer of the invention, a general test performed by the vital timer is to assure that the 3 MHz crystal clock produces a machine cycle of 5.0 msec. This is accomplised by comparing the time required to execute a known number of instructions to the time interval defined by the auxiliary clock formed by the clock check circuits 14. During the duration of the known number of instructions performed by the microprocessor 10, a counter inside the processor counts the 50 kHz pulses produced at the output of the divider 66. This internal counter may be preset, started, read and stopped by program instructions.

The clock check is used in two ways according to the invention. Firstly, it may be used to time a program segment which runs only once. When used in this way, the number of auxiliary clock pulses counted while the program segment is run is used to generate a checkword. The clock check is also used in a second way to time the running of a program loop which generates a vital time base clock which is a primary task of the vital timer of the invention. Since the program loop by which the time base clock is generated may be executed a few hundred times to generate time intervals of a few seconds or tens of thousands of times to generate minutes, a time check count cannot easily be used to form a clock check checkword per se. Instead, the program loop generating the time base clock utilizes diversity techniques for verifying failure-free operation, as shown in FIG. 4B and as is now described.

Figure 4A:
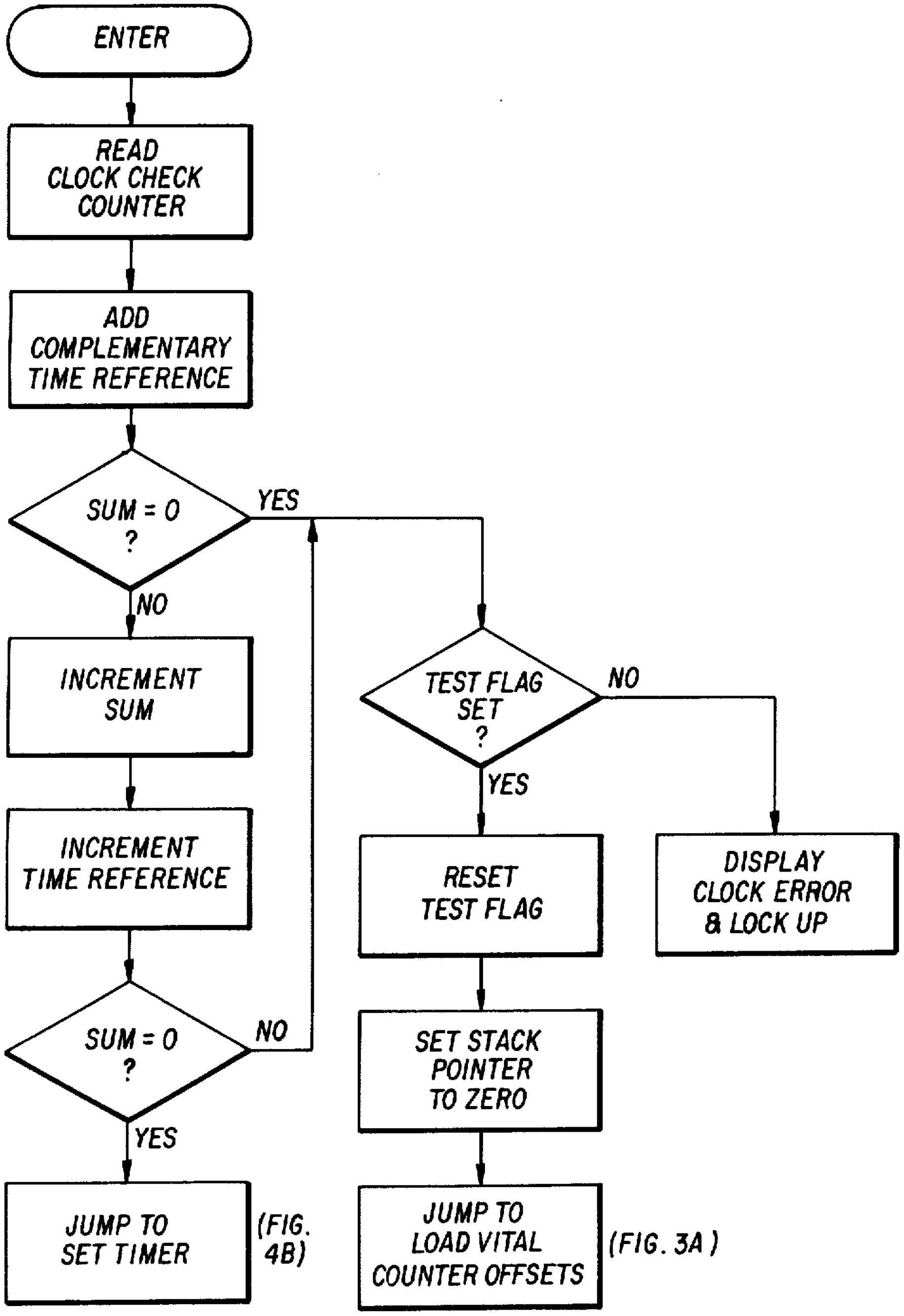

Generation of the time base clock is accomplished by means of a pair of counting registers within the microprocessor 10. Upon beginning of the program loop for the generation of the time base clock, the counting registers provided for that purpose are loaded with base words having a predetermined logical correspondence to each other. For convenience, this design will be described herein with registers loaded with logically complementary numbers that are alternately incremented by instructions timed by the internal clock of the microprocessor 10. Thus, during the time cycle in which a time base clock is generated, the numbers stored in the true complementary counting registers should be exactly complementary, which fact is checked and verified to assure correct processing of the time base clock. Furthermore, for each pass in the program loop for generation of the time base clock, a preset number is loaded into the clock check counting register. At a predetermined point in the generation of the time base clock the count of the clock check counting register, as shown in the flow chart of FIG. 4A, is compared to a complementary reference value to verify that the count of the clock check counting register bears correspondence to the predetermined reference value. If the final value of the time base clock check counting register does not correspond to the reference value, then the processor stops timing and displays a time error. The preset and reference numbers used in the clock check subroutine are stored in respective registers within the microprocessor. These registers are respectively incremented and decremented for each pass through the time base clock program loop. Thus, through each pass of the time base clock program loop, the preset and reference values for the clock check counting register are changed to ensure that for each time check, new and different counting register values are required to allow the program to continue to run. However, the difference between the preset and the reference numbers is always the same, because the same number of machine cycles are always being counted in the repetitive generation of the time base clock.

In order to prove that the clock check is capable of detecting a failure in the generation of the time base clock, a test flag is set and erroneous preset reference values are used in a test clock check subroutine shown in FIG. 4A, thereby simulating an error condition. Upon detection of the fault in the error routine, the test flag is reset within the microprocessor verifying the pre-program system performance. Optionally, a program status checkword is then generated verifying that the test flag has been reset. The program status checkword is then also stored in the data memory of the data processor 10 for utilization in the output program.

In addition to the I/O port 44, the microprocessor 10 further includes another I/O port 70, and a bus port 72. These three ports are used to read the time setting established in the time data selector 12, and are arranged to provide a 10 bit output word, a 10 bit input word, and a 4 bit input word. The two 10 bit words are connected to each other through the buses of the time data selector switch which enables program testing of the microprocessor ports.

The time data selector 12, as noted above, is a matrix switch for generating time data signals indicative of the preselected time interval to be generated by the vital timer of the invention. The time data selector switch 12 is marked in decimal minutes and seconds, with ten horizontal buses, called bits, carrying decimal values and four vertical buses called digits, representing units of seconds, tens of seconds, minutes, and tens of minutes, of the time interval to be generated. The preselected time interval is established by connecting the switch contact of each digit line with the bit line corresponding to the desired time interval value. For example, if a ten minute time digit were to be selected, the switch contact of the ten minute vertical line would be connected to the unit "1" bit, while the remaining switch contacts of the digit lines would be connects to the "0" bit line.

Figure 5A:
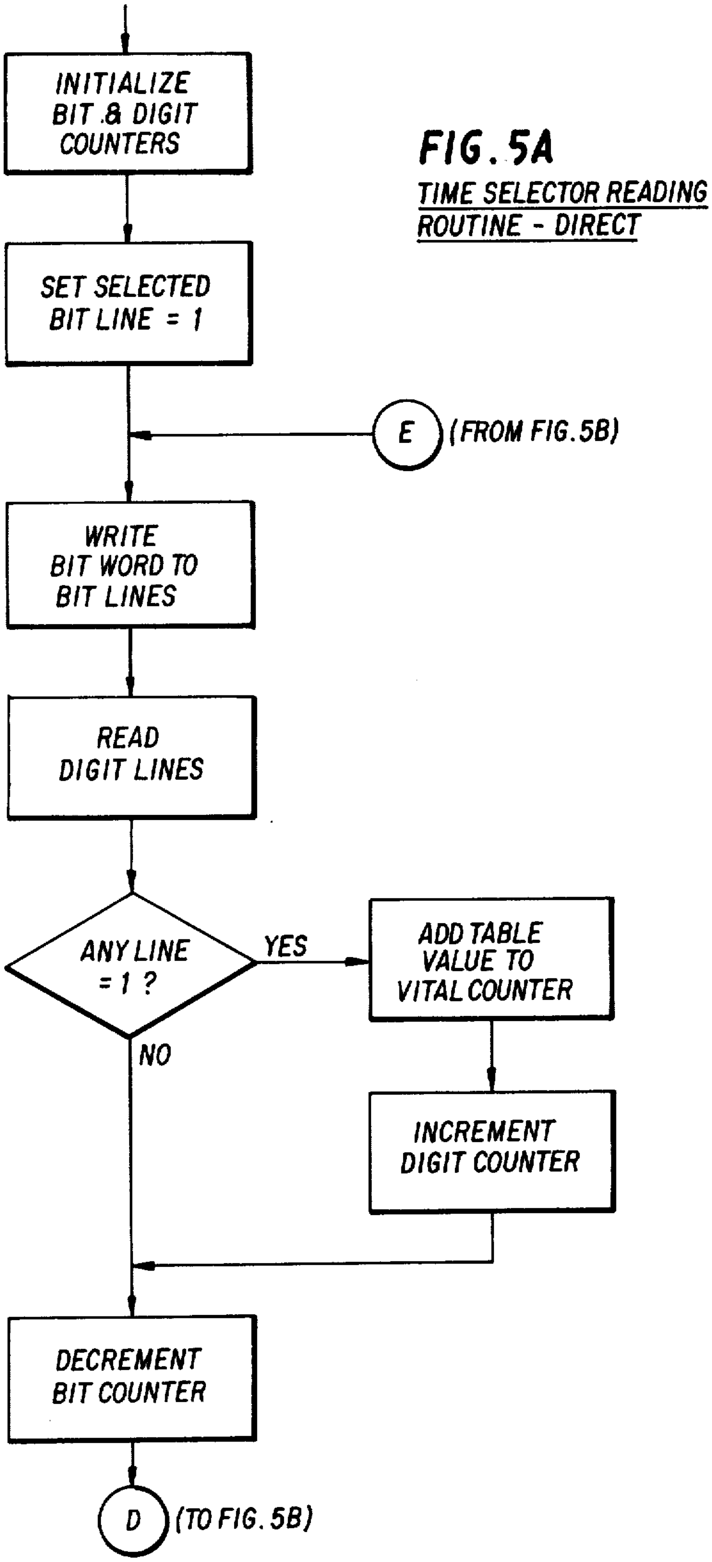
Figure 5B:
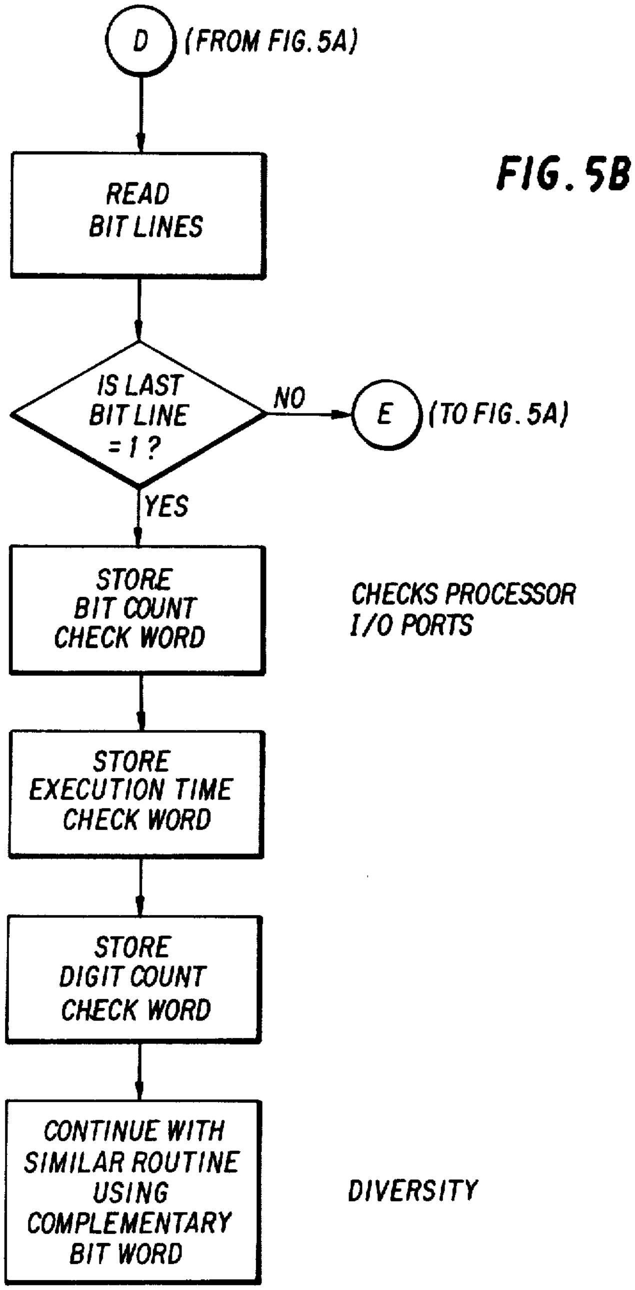
Figure 6A:
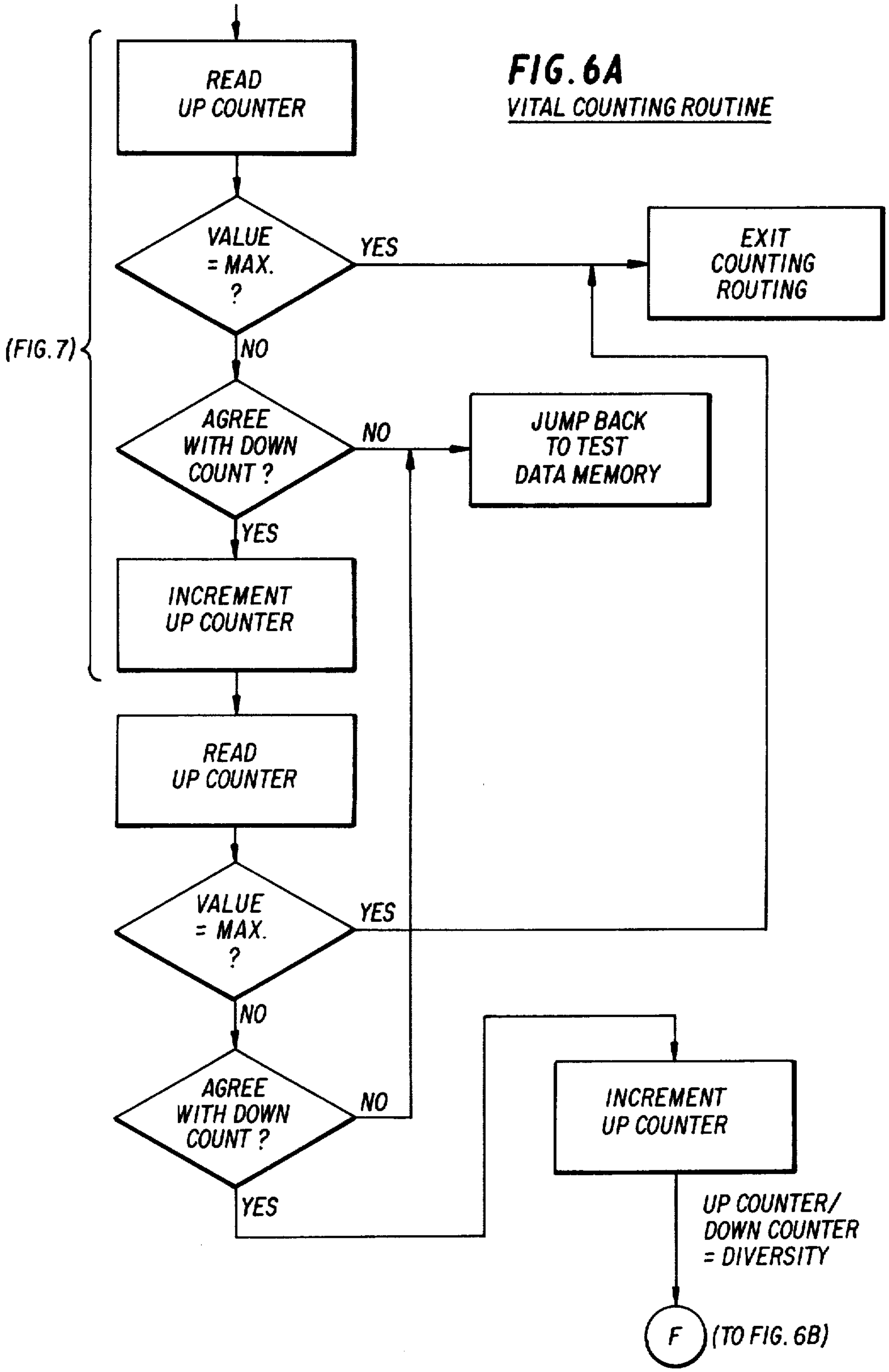
Figure 6B:
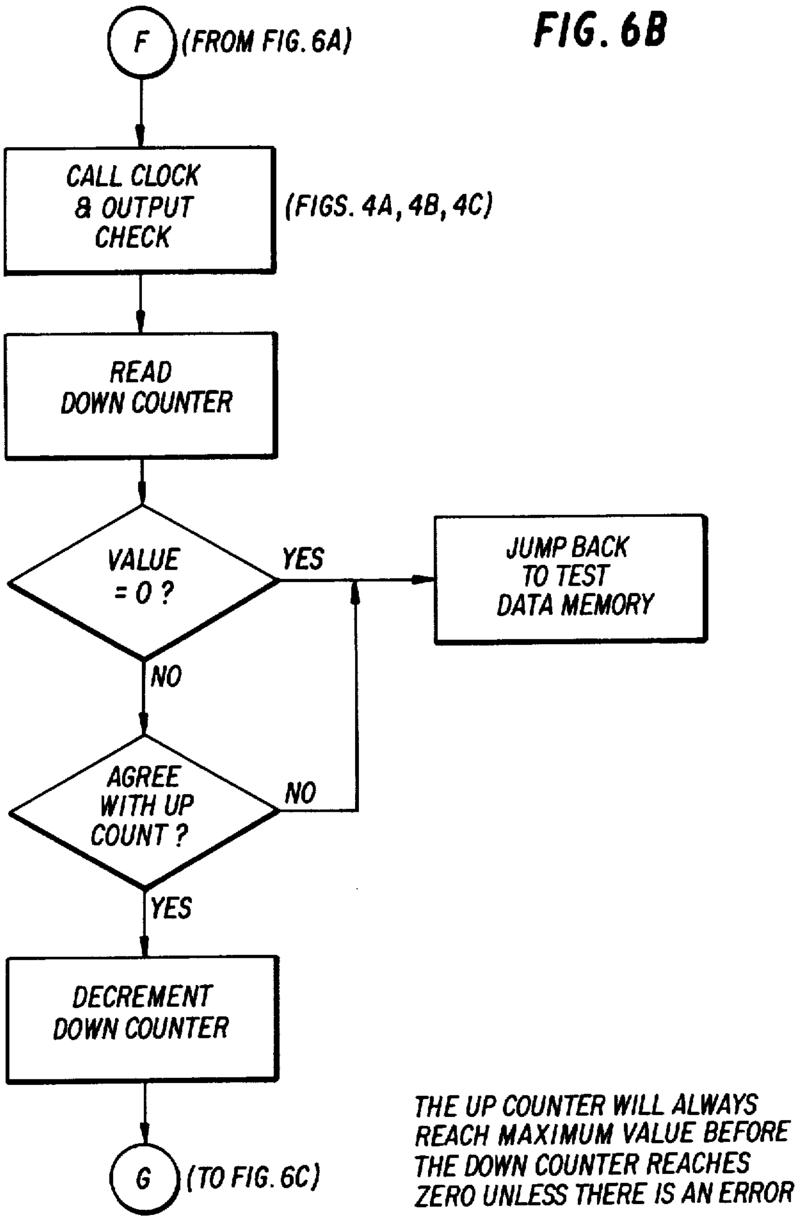
Figure 6C:
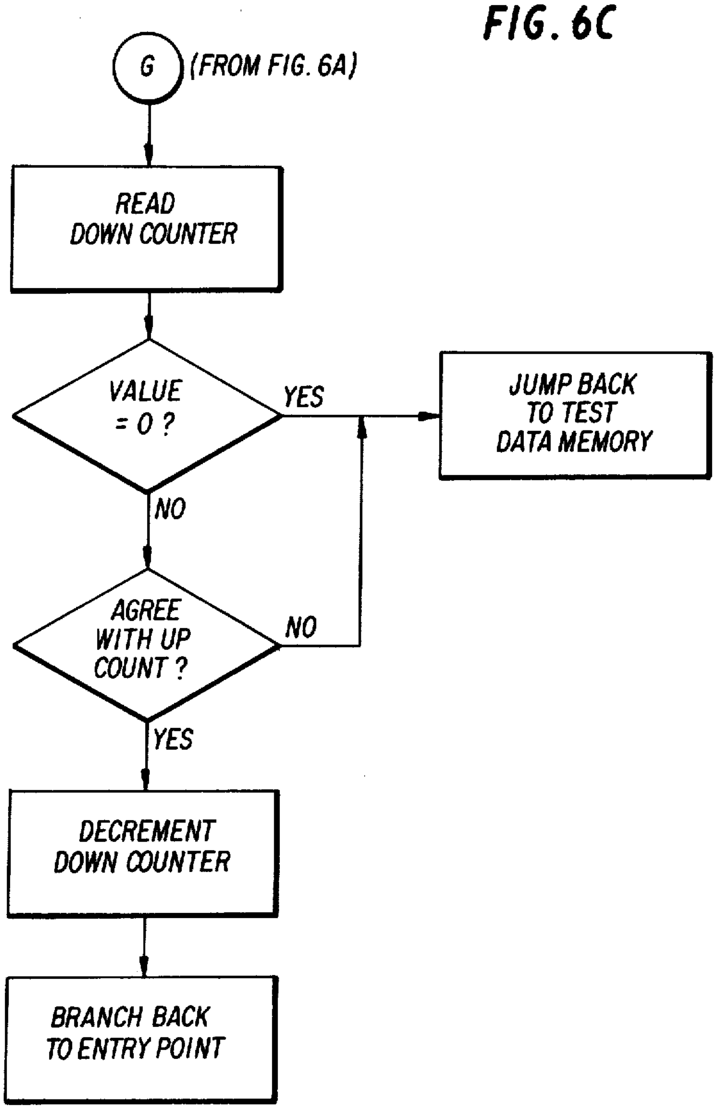
Figure 7:
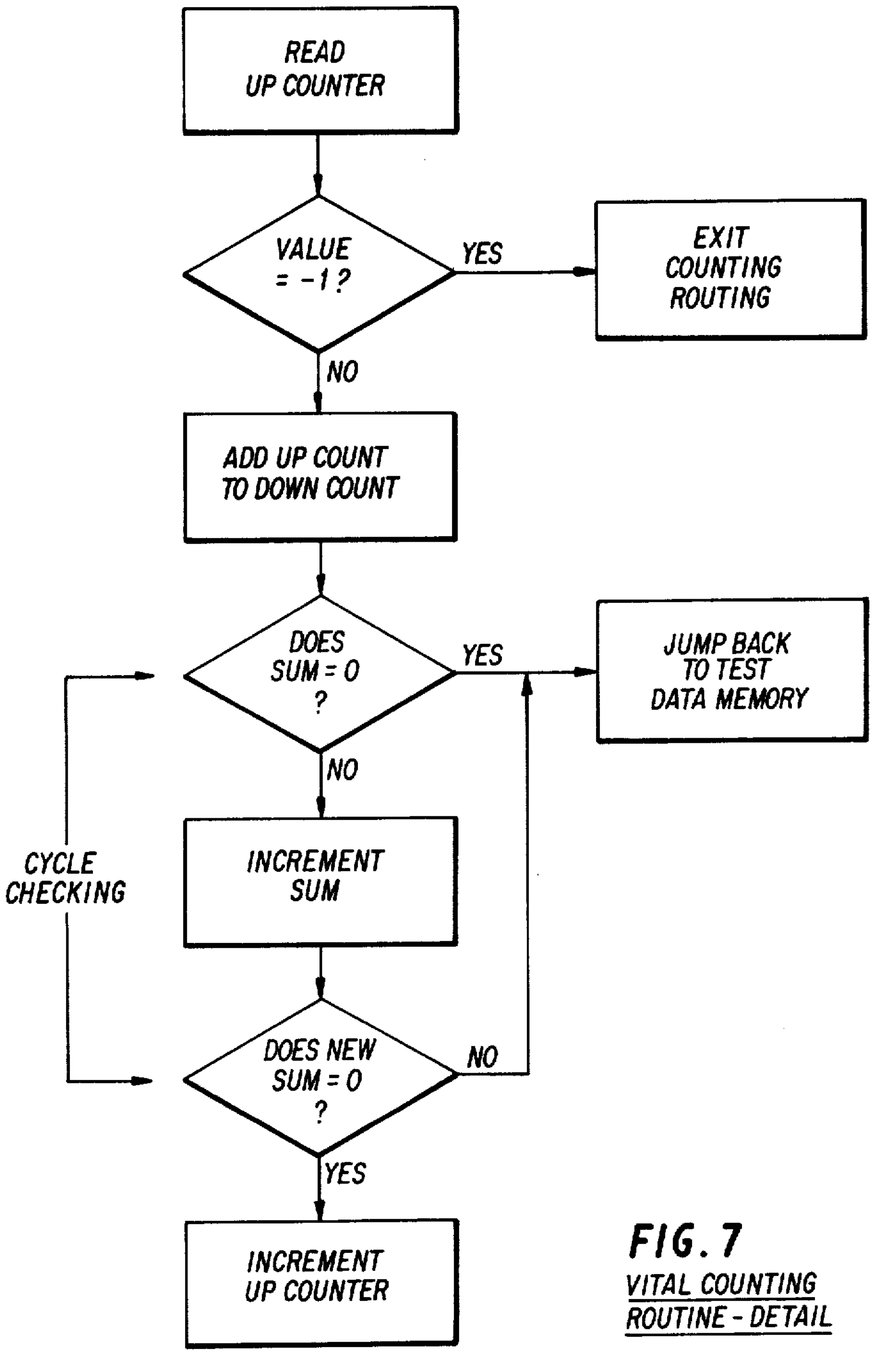

The time data selector 12 is read by means of two program segments shown in FIGS. 5A and 5B. The two readings are used to load respective counting registers utilized in two vital counting routines which use diversity as one of its vital program techniques, as discussed in more detail hereinafter. During a first program segment in which selected time data is entered in the microprocessor 10, each of the bit lines is scanned sequentially by placing a logical "1" on one line and logical "0" on all other lines. Then, the four digit lines of the selector switch 12 are tested at port 70 for the presence of a logical "1" for each scanned digit. If the logical "1" is detected at any digit, a BCD number corresponding thereto is generated by the microprocessor 10 and stored therein for later loading into the display and a number equal to the digit value expressed in numbers of time base clocks, i.e., 40 msec loops through the program loop utilized in generation of the time base clock, is added into a true vital counting register intarnal to the microprocessor 10. The logical "1" scan continues until the "1" logic level is scanned from the first bit line to the last bit line, signifying that all lines have been read.

After completion of the "logical 1" or "true scan" of the time data selector switch 12, a second scan of the time data selector switch is performed in which a logical "0" is formed on one of the bit lines of the time selector switch, while the logical "1" signal is applied to all other bit lines of the time data selector switch. The logical "0" is then sequentially scanned from bit "0" to bit "9", as was done during the logical "1" or true scan, resulting in generation of a complementary data word, which is the logical complement of the true data word generated during the true scan of the time selector switch. The complementary data word is then stored in a complementary counting register within the microprocessor 10 for generation of the preselected vital time interval.

Control of the true and complementary data scans is achieved by means of an I/O sequence enabled by the configuration of the output lines from ports 44 and 70 being fed through the time data selector switch 12 and back to the bus I/O port 72 using port scanning techniques similiar to those disclosed in my related application Ser. No. 157,658. Thus, the bit lines fed back into the bus port 72 are connected with an offset, i.e., bit 9 output wired to bit 8 input, bit 8 output to bit 7 input, . . . bit 0 output to bit 9 input. Thus, each time the output/input sequence is repeated, the logical "1" bit during the true scan or the logical "0" bit during the complementary scan is read with an offset at the bus input port 72 by which the microprocessor then controls the next output bit to which the logical "1" or logical "0" signal is applied during the respective true and complementary scans. Thus, each time the out/in sequence is repeated, a logical "1" or logical "0" progresses through the bit lines depending upon the positioning of the respective "1" or "0" levels being read through the time selector at ports 70 and 72. At the end of the true and complementary scans, a scan counter which counts the number of times a logical "1" and/or a logical "0" signal is outputted to a bit level line and returned to ports 70, 72, is read and the resulting count used as a scan count checkword. This arrangement tests the ports and the bit lines. Any short or open circuit conditions will cause an error in the scan counter. A second checkword indicative of the time taken to perform the true and complementary scans is obtained from the clock check counter internal to the microprocessor 10, and this scan time checkword verifies that the correct number of machine cycles was run during the true and complementary data scans. Also, since the switch contacts of the time data selector 12 each can contact only a single bit line outputted from the microprocessor, the logical "1" or the logical "0" signal can only be read once for each digit line inputted to the port 70 during a respective true or complementary scan. Thus, a further checkword, designated a digit count checkword, is formed verifying correct number of times a logical "1" value is fed into the port 70 through the time data selector switch during the true scan of the switch 12. Alternately, a similar digit count can be compiled during the complementary scan of the time selector switch 12. The scan count, scan time, and digit count checkwords are stored in the data memory of the microprocessor 10 after generation thereof. FIGS. 5A and 5B are flow charts illustrating checkword formation during data entry as above described.

From the above description, it is seen that a true time data word and a complementary time data word are respectively formed during the true and complementary scans of the time data selector switch 12. The true and complementary time data words are respectively stored in true and complementary vital counting registers which count a number of time base clocks corresponding to the true and complementary time data words respectively stored in these registers. FIGS. 6A, 6B, 6C and 7 are flow charts illustrating the counting operation, which is similiar to the counting techniques disclosed in my U.S. patent application Ser. No. 119,655 and my U.S. Pat. No. 4,090,173. The vital counters are therefore diverse since the true and complementary time data words initially stored therein are logically complementary. The true and complementary time data counters each count 25 time base clocks produced by the vital time loop for each second of the preselected interval. Since the true and complementary time data counters are alternately incremented, counter comparison tests are made upon every second time base clock to verify that the incremented numbers stored in the true and complementary vital counters are exactly logically complementary at each second time base clock. If the numbers loaded into the counter registers are not exactly complementary at the start and during half of the comparison tests, the vital program of the vital timer of the invention will lock up. Thus, this vital test feature is used not only to prove that the routine is counting properly, but to ensure that the time setting from the time data selector switch 12 was loaded properly. FIGS. 6A, 6B, 6C and 7 are flow charts illustrating the above operation.

As an added measure to protect against erroneous data entry from the time data selector switch 12, prior to reading of the switch 12 the microprocessor 10 loads the vital data counting registers which are subsequently to be loaded with the true and complementary time data words with offset words which would cause the vital program to lock up if the count routine were prematurely or erroneously entered, or if erroneous data is entered into the microprocessor. Different offset words are loaded into the true and complementary vital time counters. After loading of the different offset words into the respective true and complementart data counting registers, a sum is formed of the offset words located in these counters, with the sum forming an offset sum checkword which is then stored in the data memory of the microprocessor 10. A correct offset sum checkword verifies that the offset words were properly loaded.

Since different offset words are loaded into the true and complementary data counters, these words would cause the program to lock up if the count routine were prematurely or erroneously entered, since noncomplementary values would be formed in the counters upon each alternate decrement thereof.

After the above described formation of the offset sum checkword, the offset words are still loaded in the vital data counting registers and must be replaced with time data words subsequently generated. However, the time data words are not directly loaded into the data counters, but instead are used to address a table memory in the microprocessor 10. This table memory stores numbers corresponding to the number of counts that are needed to produce a certain time interval, plus a negative offset corresponding to the offset words respectively stored in the true and complementary time data counting registers. Then, the addressed number in the table memory is added to the number stored in the respective time data counting register, with the result that the initially loaded offsets are cancelled, leaving the true and complementary time data words derived from the true and complementary time data selector scans, respectively, loaded in respective time data counting registers.

When the diverse vital time data counting registers which increment the true and complementary time data words complete counting the correct number of vital time base clocks to produce the preselected time interval called for by the switches, the vital program according to the invention performs a signature analysis of the program memory which stores the offset table and program routines to produce program signature checkwords which are then stored in the data memory along with the other checkwords previously derived. Then a signature analysis is performed on all the checkwords stored in the data memory to produce farther data signature checkwords which are also than stored in the data memory, completing the formation of checkwords. (The signature analysis is performed by means of a cyclic redundancy check of the stored checkwords, in a fashion discussed by Schweber et al, "Software Signature Analysis Identifies and Checks PROMs", Edn. Nov. 5, 1978, pp. 79-81, as described in related commonly owned application Ser. No. 007,184 filed Jan. 29, 1979.) The signature analysis is performed by converting memory contents into a serial bit stream, and passing the bit stream through a 16-bit shift register (in software). The bit stream is divided by a preselected polynomial, with the remainder of the division forming a unique signature. Remainders are formed by means of the cyclic redundancy check for each page of program memory and the data memory and are used to generate the program and data signature checkwords which validate program memory and verify the correctness of the prior checkwords stored in the data memory of the microprocessor 10. Then, the output routine is entered by which the 10 kHz output signal to the tuned vital driver is generated.

Figure 8:
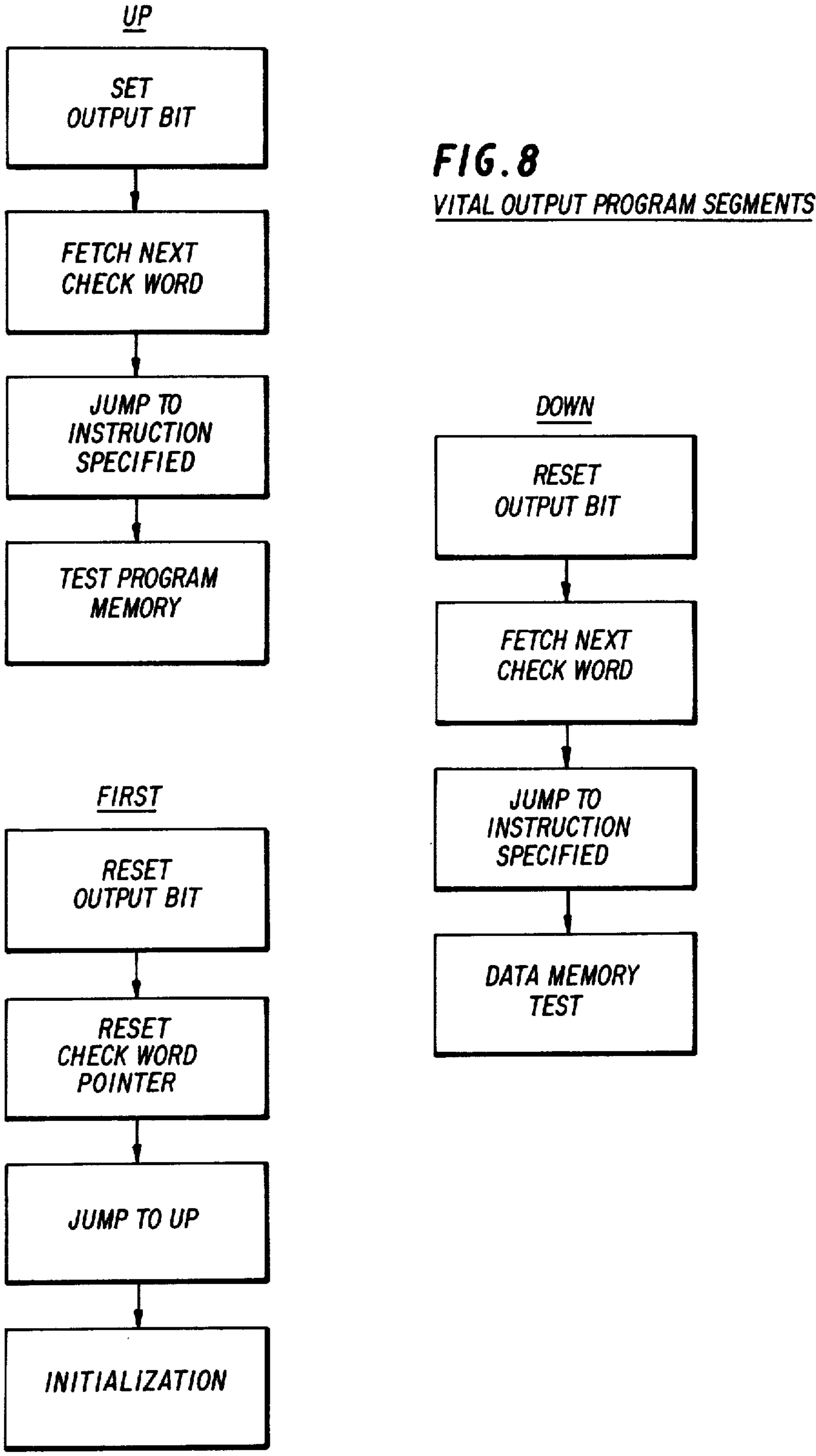

The output routine, according to the invention, alternately sets and resets an output port bit to generate the requisite 10 kHz signal in a manner similar to that shown in my U.S. Application Ser. No. 119,655. However, the program for the output routine resides in the program memory in a form that cannot run as schematically shown in FIG. 8. This is true because the instructions are arranged in three groups, and the groups are stored in program memory in an incorrect order, each group separated from any other group either by a lockup instruction or optionally by an instruction returning operation to a selected test routine. The output program will run only if the groups of instructions are accessed in the correct order which will only occur if each checkword was produced and properly stored in a respective data memory location. Due to hardware limitations of the selected Intel 8748 microprocessor, it is not possible to directly address respective groups of output instructions, but only indirectly by means of a KEY table. The checkwords previously formed and stored in the memory are used to access the KEY table, the contents of which then address respective output instructions. The checkwords are generated during the running of the timer cycle as discussed above, and are an assurance that all vital tests and checks have been nade and were passed. Since the output instructions are located at addresses whose value exists only in the key table, if an incorrect checkword accesses a memory area outside of the key table, the program will use an instruction code or immediate byte as a branch address. None of these values on the page is an output instruction address, which will preclude output of the 10 kHz signal to the tuned vital driver.

As outlined earlier, the output to the vital driver is maintained at a predetermined logic level until execution of the output program. Each of the checkwords formed during processing of the preselected time interval are utilized to address respective output instructions which alternately vary the output to the tuned vital driver from a logic "1" level to a logic "0" level at a 10 kHz rate. However, a further feature of the vital timer of the invention resides in the fact that the initially formed, or firstly formed in time, checkwords each accesses an output instruction which would maintain the logic level at the vital output to the tuned vital driver at the initial logic level, i.e., logic "1". It is only upon the formation of the signature checkwords which correspond to key numbers which change the output state of the vital driver output of the microprocessor 10 to a logic "0" level that any instructions which would change the output level to the tuned vital driver to a different logic level can be addressed. In this way, it is further assured that the means for producing the 10 kHz output to the tuned vital driver is not formed until the last possible moment, after generation of the preselected time interval, to preclude premature generation of any time varying signal at the input of the tuned vital driver.

A further feature of the invention resides in the inherent capability of using the vital timer of rhe invention as a display for diagnostic testing purposes. For example, if an error is detected during generation of the preselected time interval, the fact of an error detection is easily indicated by display of a nonsense word by the BCD display, e.g., "99 99". Furthermore, depending upon the capabilities of the microprocessor 10, or the degree of sophistication desired or permissible within economic constraints, it is readily conceivable that the microprocessor 10 can be configured with means for interrogating the contents of various registers and for displaying these contents via the BCD display. Such a capability would be highly useful for determining which of the checkwords indicates a fault, and therefore for fault isolation.

To recapitulate, the vital timer of the invention implements a vital time element relay using a microprocess of the Intel 8748 type. Salient features of the vital timer of the invention are:

timing of program segments as an assurance of their having run correctly, use of checkwords to address the instructions in an output vital driver routine, testing of vital routines, and vital reading of a matrix switch.

Since the vital timer of the invention does not use mechanical means for timing, one model can cover a wide performance range, can be used over a wide voltage range, and is not limited to a particular contact arrangement.

Additional features of the vital timer of the invention are the ease of time setting provided by the matrix timedata selector switch. Also, system accuracy of $\pm 0.1\%$ of the set time plus the relay operating time is easily implemented, with any time used during vital processing and checkword formation being easily counted for in the software. The vital timer of the invention eliminates the need for a check contact. Furthermore, the vital timer of the invention readily permits display of time to go in the preselected time interval, completion of generation of the time interval, the progression of each second of the generated time interval, and the display of fault conditions.

The vital timer of the invention may be used with any output relay or as a voltage output device. The output circuit can be designed to produce the required power.

When used as a time element relay, the vital timer of the invention delivers output power at the end of a selected time interval. The time interval may be increased by failures (momentary interruption of power, for example), but never shortened.

Obviously, numerous modifications and variations of the present invention are possible in light of the above teachings. For example, to a certain extent the particular checkwords generated by the software, and their particular utilization in the output instruction addressing, are a matter of choice in view of the safety redundancy provided by some of the checkwords. Clearly, the checkwords can be formed and utilized in various combinations, as may be desired for a particular application. Also, it is entirely feasible to verify checkword formation at intermediate points of the selected time interval, by means of conventional "check sum" techniques or signature analysis techniques, to identify a system error early in the selected time interval, rather than wait until the end of the time interval. This is indicated in the flow chart of FIG. 3A, where in the "checkword OK" step, successful data entry is initially checked. It is therefore to be understood that within the scope of the appended claims the invention may be practiced otherwise than as specifically described herein.

What is claimed as new and desired to be secured by Letters Patent of the United States is:

1. A vital timer for producing a predetermined output at the expiration of a selected time interval, comprising:

data generation means for producing at least one time data word representative of said selected time interval;

processing means coupled to said data generation means for determining the expiration of said selected time interval and thereupon producing said predetermined output, said processing means comprising, clock means for producing clock signals at a predetermined clock rate, counter means including at least one counting register coupled to said data generation means and loaded with said at least one time data word, said at least one counting register coupled to said clock means and counting said clock signals for said selected time interval whereupon said at least one register indicates the expiration of said selected time interval, checking means for monitoring said data generation means and said counter means and for producing plural predetermined checkwords indicative of failure-free production of said time data word by said data generation means and failure-free counting of said clock signals by said counter means, output means coupled to said checking means and said vital counter means for producing said predetermined output at the end of counting of said clock signals for said selected time interval, including means for verifying the production of said plural checkwords by utilizing said checkwords to produce said predetermined output at the end of said selected time interval only upon error free production of each of said checkwords, said verifying means comprising means for verifying individually the production of each of said checkwords.

2. A vital timer according to claim 1, wherein said checking means comprises:

clock rate means for verifying the predetermined clock rate of said clock signal, said clock check means coupled to said output means which produces said predetermined output only upon verification of said predetermined clock rate by said clock check means.

3. A vital timer according to claim 2, wherein said clock check means comprises:

auxiliary clock means for generating auxiliary clock signals, and means for comparing the period of said auxiliary clock signals with the period of said clock signals.

4. A vital timer according to claim 1, further comprising:

said clock means comprising, primary clock means for producing primary clock signals having a predetermined clock rate, means for producing first and second base words having a predetermined logical correspondence, diverse first and second base counters respectively loaded with said first and second base words for respectively counting said primary clock signals, said counters respectively being incremented by said primary clock signals for a predetermined number of said primary clock signals, means for generating time base clock signals for clocking of said at least one counting register each time said base counters are incremented said predetermined number of primary clock signals, said time base clock signals being used as said clock signals for clocking of said at least one counting register; and said checking means comprising means for verifying that said first and second base counters maintain said predetermined logical correspondence during clocking by said primary clock signals.

5. A vital timer according to claim 4, wherein said checking means comprises:

clock check means for verifying the predetermined clock rate of said clock signal, comprising, auxiliary clock means for generating auxiliary clock signals having a predetermined frequency, an auxiliary counter clocked by said auxiliary clock signals, memory means for storing predetermined associated pairs of clockcheck preset words and clockcheck verification words, means for loading said auxiliary counter with one of said preset words upon start of a period corresponding to the clock rate, and means for verifying that when each time base clock signal is generated, said auxiliary counter has an output state corresponding to the clockcheck verification word associated with the preset word loaded in said auxiliary counter.

6. A vital timer according to claim 5, further comprising:

said clock check means selecting different associated pairs of clockcheck words for checking of successive time base clock signals.

7. A vital timer according to claim 1, comprising:

said data generation means comprising means for producing at least two diverse time data words;

said counter means comprising at least two diverse counting registers loaded with respective of said diverse time data words; and said checking means comprising means for producing plural checkwords indicative of failure-free production of said diverse time data words and failure-free counting of said clock signals by said diverse counting registers.

8. A vital timer according to claim 1, further comprising:

said processing means comprising at least one n-bit output port, at least one n-bit input port, and at least one m-bit input port, wherein the bits of the n-bit output port are coupled to the bits of the n-bit input port with an offset in the position of the bits connected;

said data generation means comprising, an n×m matrix switch having n inputs connected to the n-bit output port, m outputs connected to the m-bit input port, and means for connecting each of said n inputs to respective selected of said m outputs;

means for sequentially scanning said n-bit output port by sequentially applying a true logic level to one of the bits of said n-bit output port while applying a complementary logic level to the other bits of said n-bit output port, means for reading at said m-bit input port for each application of said true logic level whether said true logic level is present on any of the bits of said m-bit input port.

means for controlling the true scan of said n-bit output port based on the bit position of the true logic level read at the n-bit input port, means for repeating the scan of the n-bit output port by sequentially applying a complementary logic level to one of said n-bit output port bits while maintaining the remaining bits of said n-bit output port at a true logic level, the repeat scan being controlled by the position of said complementary bit read at the n-bit input port;

means for converting the data read at the m-bit input port during the true logic level scan and during the complementary logic scan into diverse true and complementary time data words, respectively.

9. A vital timer according to claim 8, wherein said checking means comprises:

scan counting means for counting the number of times of true logic level and the complementary logic level is applied to one of the bits of said n-bit output port, and means for forming a scan count checkword based on the count formed by said scan counting means, wherein forming of said scan count checkword is verified by said output means.

10. A vital timer according to claim 9, wherein said checking means further comprises:

auxiliary clock means for generating auxiliary clock signals;

scan count timing means clocked by said auxiliary clock means for measuring the amount of time taken to perform the true logic level scan and the complementary logic level scan; and means for forming a scan time checkword based on the time measured by said scan count timing means, wherein forming of said scan time checkword is verified by said output means.

11. A vital timer according to claim 9, wherein said checking means further comprises:

digit counting means for counting the number of times a true logic level appears upon said m-bit port during the true scan of said n-bit output port; and means for forming a digit count checkword based on the count produced by said digit counting means, wherein forming of said digit count checkword is verified by said output means.

12. A vital timer according to claim 9, wherein said checking means further comprises:

digit counting means for counting the number of times a complementary logic level appears upon said m-bit input port during the complementary scan of said n-bit output port, and means for forming a digit count checkword based on the count produced by said digit counting means, wherein forming of said digit count checkword is verified by said output means.

13. A vital timer according to claim 7, further comprising:

said checking means comprising, offset means for loading predetermined different offset words into said diverse counting registers, means for using said time data words to address a table memory which stores basic count words equal to said time data words minus respective offset words, and means for adding said basic count words addressed by respective time data words to the offset words stored in respective of said diverse counting registers such that after addition thereto only said time data words are stored in respective of said diverse counting registers, and means for verifying that said diverse counting registers maintain a predetermined correspondence during counting of said clock signals, said verifying means coupled to said output means which includes means for producing said predetermined output only in the event that said predetermined correspondence is maintained.

14. A vital timer according to claim 13, wherein said checking means further comprises:

summing means for adding the contents of the diverse counting registers after loading of the respective offset words therein, means for forming an offset sum checkword based on the sum of the offset words added by said summing means, wherein forming of said offset sum checkword is verified by said output means.

15. A vital timer according to claim 14, wherein said checking means further comprises:

auxiliary clock means for generating auxiliary clock signals, offset time counting means clocked by said auxiliary clock means for measuring the amount of time taken from loading of said offset words until said time data words are stored in said diverse counting registers, and on the amount of time measured by said offset time counting means, wherein forming of said offset time checkword is verified by said output means.

16. A vital timer according to claim 7, wherein said checking means comprises:

clock check means for verifying the predetermined clock rate of said clock signal and for producing a corresponding checkword.

17. A vital timer according to claim 16, wherein said clock check means comprises:

auxiliary clock means for generating auxiliary clock signals, and means for comparing the period of said auxiliary clock signals with the period of said clock signals.

18. A vital timer according to claim 17, further comprising:

said clock means comprising, primary clock means for producing primary clock signals having a predetermined clock rate, means for producing first and second base words having a predetermined logical correspondence, diverse first and second base counters respectively loaded with said first and second base words for respectively counting said primary clock signals, said counters respectively being incremented by said primary clock signals for a predetermined number of said primary clock signals, means for generating time base clock signals for clocking of said vital registers each time said base counters are incremented said predetermined number of primary clock signals, said time base clock signals being used as said clock signals for clocking of said diverse counting registers; and said checking means verifying that said first and second base counters maintain said predetermined logical correspondence during clocking by said primary clock signals.

19. A vital timer according to claim 18, wherein said checking means comprises:

clock check means for verifying the predetermined clock rate of said clock signals, comprising, auxiliary clock means for generating auxiliary clock signals having a predetermined frequency, an auxiliary counter clocked by said auxiliary clock signals, memory means for storing predetermined associated pairs of clockcheck preset and clockcheck verification words, means for loading said auxiliary counter with one of said preset words upon start of a period corresponding to the clock rate, and means for verifying that when each time base clock signal is generated, said auxiliary counter has an output state corresponding to the clockcheck verification word associated with the preset word loaded in said auxiliary counter.

20. A vital timer according to claim 19, further comprising:

said clock check means including means for selecting different associated pairs of clockcheck words for checking of successive time base clock signals.

21. A vital timer according to claim 7, wherein said checking means comprises:

memory means for storing each checkword upon formation thereof, said memory means coupled to said output means and providing said checkwords for verification upon expiration of said selected time period, a table memory for storing plural preprogrammed dummy words, means for clearing said memory means upon initiation of the generation of said predetermined time interval, means for fetching said dummy words from said table memory and temporarily loading said dummy words in said memory means after clearing of said memory means;

means for reading the contents of said memory means and forming the sum of said dummy words stored in said memory means after loading of said dummy words in said memory means; and means for forming a memory sum checkword based on the sum of the dummy words temporarily loaded into the memory means, said memory sum checkword then stored in said memory means and verified by said output means.

22. A vital timer according to claim 21, wherein said checking means comprises:

auxiliary clock means for generating auxiliary clock signals, memory check counting means clocked by said auxiliary clock means for measuring the amount of time taken to form said memory sum checkword, and means for forming a memory time checkword based on time taken to form said memory sum checkword, said memory time checkword stored in said memory means and verified by said output means.

23. A vital timer according to claim 7, further comprising:

said checking means comprising memory means for storing each checkword upon formation thereof;

said output means comprising, memory means for storing an output program organized as groups of output instructions, each instruction group being accessible based on a predetermined checkword, said output means producing said predetermined output only when each output instruction group is accessed in a predetermined sequence, and means for accessing said groups of output instructions in said predetermined sequence based on respective checkwords to produce said output at the end of said selected time interval, wherein said output is produced only in the event that errorless vital timer performances is verified by errorless formation of said checkwords and accessing of respective groups of instructions of said output program by said respective of said checkwords.

24. A vital timer according to claim 23, further comprising:

a vital driver tuned to a predetermined frequency, said output program stored in said memory means organized such that said groups of instructions are repetitively accessed in said predetermined sequence, such that a square wave output signal having a frequency equal to the tuned frequency of said tuned vital driver is produced at an output signal port, said tuned vital driver producing said predetermined output upon generation of said output signal.

25. A vital timer according to claim 24, further comprising:

said checking means firstly forming only selected checkwords used to access respective output group instructions which set the output signal port at an initial logic level corresponding to the logic level of said output signal port prior to initiation of the generation of said preselected time interval, and only thereafter forming checkwords which access output group instructions which change the logic level of the output signal port to a logic level opposite to the logic level of said output signal port prior to initiation of the generation of said selected time interval.

26. A vital timer according to claim 7, wherein said checking means further comprises:

memory means for storing each checkword upon formation thereof, said memory means coupled to said output means and providing said checkwords for verification thereby, means for performing a cyclic redundancy check on the checkwords stored in said memory means, including means for forming a serial stream of bits derived from said checkwords and dividing said stream of bits by at least one preselected polynomial to produce at least one remainder word, and means for producing at least one signature checkword based on the at least one remainder word, wherein forming of said at least one signature checkword is verified by said output means.

27. A vital timer according to claim 7, wherein said checking means further comprises:

failure simulation means for simulating a vital timer fault, means for detecting the simulated fault and verifying that the simulated fault is detected.

28. A vital timer according to claim 7, further comprising:

a vital driver tuned to a predetermined frequency, said output means producing at the end of said time interval a square wave output signal having a frequency equal to the tuned frequency of said tuned vital driver at an output signal port, said tuned vital driver producing said predetermined output upon generation of said output signal.

29. A vital timer according to claim 1, wherein said checking means comprises:

memory means for storing each checkword upon formation thereof, said memory means coupled to said output means and providing said checkwords for verification upon expiration of said selected time period.

a table memory for storing plural preprogrammed dummy words, means for clearing said memory means upon initiation of the generation of said predetermined time interval, means for fetching said dummy words from said table memory and temporarily loading said dummy words in said memory means after clearing of said memory means;

means for reading the contents of said memory means and forming the sum of said dummy words stored in said memory means after loading of said dummy words in said memory means; and means for forming a memory sum checkword based on the sum of the dummy words temporarily loaded into the memory means, said memory sum checkword then stored in said memory means and verified by said output means.

30. A vital timer according to claim 27, wherein said checking means comprises:

auxiliary clock means for generating auxiliary clock signals, memory check counting means clocked by said auxiliary clock means for measuring the amount of time taken to form said memory sum checkword, and means for forming a memory time checkword based on time taken to form said memory sum checkword, said memory time checkword stored in said memory means and verified by said output means.

31. A vital timer according to claim 1, further comprising:

said checking means comprising memory means for storing each checkword upon formation thereof;

said output means comprising, memory means for storing an output program organized as groups of output instructions, each instruction group being accessible based on a predetermined checkword, said output means producing said predetermined output only when each output instruction group is accessed in a predetermined sequence, and means for accessing said groups of output instructions in said predetermined sequence based on respective checkwords to produce said output at the end of said preselected time interval, wherein said output is produced only in the event that errorless vital timer performance is verified by errorless formation of said checkwords and accessing thereby of respective group of instructions in said output program.

32. A vital timer according to claim 31, further comprising:

a vital driver tuned to a predetermined frequency, said output program stored in said memory means organized such that said groups of instructions are repetitively accessed in said predetermined sequence, such that a square wave output signal having a frequency equal to the tuned frequency of said tuned vital driver is produced at an output signal port, said tuned vital driver producing said predetermined output upon generation of said output signal.

33. A vital timer according to claim 32, further comprising:

said checking means firstly forming only selected checkwords used to access respective output group instructions which set the output signal port at an initial logic level corresponding to the logic level of said output signal port prior to initiation of the generation of said preselected time interval, and only thereafter forming checkwords which access output group instructions which change the logic level of the output signal port to a logic level opposite to the logic level of said output signal port prior to initiation of the generation of said selected time interval.

34. A vital timer according to claim 1, wherein said checking means further comprises:

memory means for storing each checkword upon formation thereof, said memory means coupled to said output means and providing said checkwords for verification thereby, means for performing a cyclic redundancy check on the checkwords stored in said memory means, including means for forming a serial stream of bits derived from said checkwords and dividing said stream of bits by at least one preselected polynomial to produce at least one remainder word, and means for producing at least one signature checkword based on the at least one remainder word, wherein forming of said at least one signature checkword is verified by said output means.

35. A vital timer according to claim 1, wherein said checking means further comprises:

failure simulation means for simulating a vital timer fault, means for detecting the simulated fault and verifying that the simulated fault is detected.

36. A vital timer according to claim 1, further comprising:

a vital driver tuned to a predetermined frequency, said output means producing at the end of said time interval a square wave output signal having a frequency equal to the tuned frequency of said tuned vital driver at an output signal port, said tuned vital driver producing said predetermined output upon generation of said output signal.

37. A vital timer according to claim 1, comprising, said processing means comprising a microprocessor having memory means for storing predetermined contents including predetermined subroutines and predetermined constants;

said checking means comprising, means for performing a cyclic redundancy check on the predetermined contents stored in said memory means, including means for forming a serial stream of bits derived from said predetermined contents and dividing said stream of bits by at least one preselected polynominal to produce at least one remainder word, and means for producing at least one signature checkword based on the at least one remainder word, wherein forming of said at least one signature checkword is verified by said output means.

38. A vital timer for producing a predetermined output at the expiration of a selected time interval, comprising:

data generation means for producing diverse time data words representative of said selected time interval;

processing means coupled to said diverse data generation means for determining the expiration of said selected time interval and thereupon producing said predetermined output, comprising clock means for producing clock signals at a predetermined clock rate, vital counter means including diverse counting registers coupled to said data generation means and loaded with respective of said diverse time data words, said registers coupled to said clock means and counting said clock signals for said selected time interval whereupon said registers indicate the expiration of said selected time interval, checking means for monitoring said data generation means and said vital counter means and for verifying failure-free loading of said time data words, and output means coupled to said checking means and said vital counter means for producing said predetermined output at the end of said selected time interval when so indicated by said registers only after verification of the failure-free loading of said time data words, said checking means comprising, memory means for storing predetermined offset words, offset means for loading predetermined different selected of said offset words into said diverse counting registers, addressing means for using said time data words to address a table memory which stores basic count words equal to said time data words minus respective offset words, means for adding said basic count words addressed by respective time data words to the offset words stored in respective diverse counting registers such that after addition thereto, the resultant sum stored in said diverse counting registers corresponds to said time data words, whereby said time data words are loaded in said diverse counting registers, and means for verifying that said diverse counting registers maintain a predetermined correspondence during counting of said clock signals, said verifying means coupled to said output means which includes means for producing said predetermined output only in the event that said verifying means verifies that said predetermined correspondence is maintained.

39. A vital timer according to claim 38, wherein said checking means further comprises:

summing means for adding the contents of the diverse counting registers after loading of the respective offset words therein, means for forming an offset sum checkword based on the sum of the offset words added by said summing means, wherein forming of said offset sum checkword is verified by said output means.

40. A vital timer according to claim 39, wherein said checking means further comprises:

auxiliary clock means for generating auxiliary clock signals, offset time counting means clocked by said auxiliary clock means for measuring the amount of time taken from loading of said offset words until said time data words are stored in said diverse counting registers, and means for forming an offset time checkword based on the amount of time measured by said offset time counting means, wherein forming of said offset time checkword is verified by said output means.

41. A vital timer for producing a predetermined output at the expiration of a selected time interval, comprising:

data generation means for producing diverse time data words representative of said selected time interval;

processing means coupled to said diverse data generation means for determining the expiration of said selected time interval and thereupon producing a predetermined output, comprising clock means for producing clock signals at a predetermined clock rate, vital counter means including diverse counting registers coupled to said data generation means and loaded with respective of said diverse time data words, said registers coupled to said clock means and counting said clock signals for said selected time interval whereupon said registers indicate the expiration of said selected time interval, checking means for monitoring said data generation means and said vital counter means and for producing plural predetermined checkwords at least indicative of failure-free production of said time data words and failure-free counting of said clock signals, including means for verifying a predetermined correspondence between the contents of said vital counting registers during counting of said clock signals thereby, and output means coupled to said checking means and said vital counter means for producing said predetermined output at the expiration of said selected time interval, including means for individually verifying the production of said predetermined checkwords and for producing said predetermined output at the end of said selected time interval when so indicated by said registers only after individual verification of the production of said checkwords and only upon verification of said predetermined vital counting register correspondence during counting thereby of said clock signals.

42. A vital timer for producing a predetermined output at the expiration of a selected time interval, comprising:

data generation means for producing at least one time data word representative of said selected time interval;

processing means coupled to said data generation means for executing predetermined subroutines to determine the expiration of said selected time interval and thereupon producing said predetermined output, said processing means comprising, clock means for producing clock signals at a predetermined clock rate, counter means including at least one counting register coupled to said data generation means and loaded with said at least one time data word, said at least one counting register coupled to said clock means and counting said clock signals for said selected time interval whereupon said at least one register indicates the expiration of said selected time interval, checking means for monitoring said data generation means and said counter means and for producing plural predetermined checkwords indicative of failure-free production of said time data word by said data generation means and failure-free counting of said clock signals by said counter means, output means coupled to said checking means and said vital counter means for producing said predetermined output at the end of counting of said clock signals for said selected time interval, including means for verifying the production of said plural checkwords and for producing said predetermined output at the end of said selected time interval only upon verification of error free production of said checkwords;

wherein said checking means comprises, clock check means for forming a checkword indicative of the predetermined clock rate of said clock signal, said clock check means coupled to said output means which produces said predetermined output only upon verification of said predetermined clock rate by said clock check means, comprising auxiliary clock means for generating auxiliary clock signals, auxiliary counter means for counting said auxiliary clock signals for the time taken by said processing means to process at least one of said predetermined subroutines, wherein the auxiliary counter means produces said checkword indicative of the predetermined clock rate of said clock signal at the end of processing of said predetermined subroutine by said processing means.

43. A vital timer for producing a predetermined output at the expiration of a selected time interval, comprising:

data generation means for producing at least one time data word representative of said selected time interval;

processing means coupled to said data generation means for determining the expiration of said selected time interval and thereupon producing said predetermined output, said processing means comprising, clock means for producing clock signals at a predetermined clock rate, counter means including at least one counting register coupled to said data generation means and loaded with said at least one time data word, said at least one counting register coupled to said clock means and counting said clock signals for said selected time interval whereupon said at least one register indicates the expiration of said selected time interval, checking means for monitoring said data generation means and said counter means and for producing plural predetermined checkwords indicative of failure-free production of said time data word by said data generation means and failure-free counting of said clock signals by said counter means, output means coupled to said checking means and said vital counter means for producing said predetermined output at the end of counting of said clock signals for said selected time interval, including means for verifying the production of said plural checkwords and for producing said predetermined output at the end of said selected time interval only upon verification of error free production of said checkwords;

wherein said checking means comprises, clock check means for verifying the predetermined clock rate of said clock signal, said clock check means coupled to said output means which produces said predetermined output only upon verification of said predetermined clock rate by said clock check means, comprising, auxiliary clock means for generating auxiliary clock signals, means for comparing the period of said auxiliary clock signals with the period of said clock signals, wherein said comparing means comprises, an auxiliary counter clocked by said auxiliary clock signals, memory means for storing predetermined associated pairs of clockcheck preset and clockcheck verification words, means for loading said auxiliary counter with one of said preset words upon start of a period corresponding to the clock rate, and means for verifying that when each clock signal is generated, said auxiliary counter has an output state corresponding to the clockcheck verification word associated with the preset word loaded in said auxiliary counter.

44. A vital timer according to claim 43, wherein said clock check means comprises:

means for selecting different associated pairs of clockcheck words for checking of successive time base clock signals.

45. A vital timer for producing a predetermined output at the expiration of a selected time interval, comprising:

data generation means for producing diverse time data words representative of said selected time interval;

processing means coupled to said data generation means for determining the expiration of said selected time interval and thereupon producing said predetermined output, said processing means comprising, clock means for producing clock signals at a predetermined clock rate, vital counter means including diverse counting registers coupled to said data generation means and loaded with said diverse time data words, said counting registers coupled to said clock means and counting said clock signals for said selected time interval whereupon said counting registers indicate the expiration of said selected time interval, checking means for monitoring said data generation means and said counter means and for producing plural predetermined checkwords indicative of failure-free production of said time data words by said data generation means and failure-free counting of said clock signals by said counter means, output means coupled to said checking means and said vital counter means for producing said predetermined output at the end of counting of said clock signals for said selected time interval, including means for verifying the production of said plural checkwords and for producing said predetermined output at the end of said selected time interval only upon verification of error free production of each of said checkwords;

said processing means comprising at least one n-bit output port, at least one n-bit input port, and at least one m-bit input port, wherein the bits of the n-bit output port are coupled to the bits of the n-bit input port with an offset in the position of the bits connected;

said data generation means comprising, an n×m matrix switch having n inputs connected to the n-bit output port, m outputs connected to the m-bit input port, and means for connecting selected of said n inputs to said m outputs;

means for sequentially scanning said n-bit output port by sequentially applying a true logic level to one of the bits of said n-bit output port while applying a complementary logic level to the other bits of said n-bit output port, means for reading at said m-bit input port for each application of said true logic level whether said true logic level is present on any of the bits of said m-bit input port, means for controlling the true scan of said n-bit output port based on the bit position of the true logic level read at the n-bit input port, means for repeating the scan of the n-bit output port by sequentially applying a complementary logic level to one of said n-bit output port bits while maintaining the remaining bits of said n-bit output port at a true logic level, the repeat scan being controlled by the position of said complementary bit read at the n-bit input port;

means for converting the data read at the m-bit input port during the true logic level scan and during the complementary logic scan into diverse true time complementary time data words, respectively.

46. A vital timer according to claim 45, wherein said checking means comprises:

scan counting means for counting the number of times of true logic level and the complementary logic level is applied to one of the bits of said n-bit output port, and means for forming a scan count checkword based on the count formed by said scan counting means, wherein forming of said scan count checkword is verified by said output means.

47. A vital timer according to claim 46, wherein said checking means further comprises:

auxiliary clock means for generating auxiliary clock signals;

scan count timing means clocked by said auxiliary clock means for measuring the amount of time taken to perform the true logic level scan and the complementary logic level scan; and means for forming a scan time checkword based on the time measured by said scan count timing means, wherein forming of said scan time checkword is verified by said output means.

48. A vital timer according to claim 46, wherein said checking means further comprises:

digit counting means for counting the number of times a true logic level appears upon said m-bit port during the true scan of said n-bit output port; and means for forming a digit count checkword based on the count produced by said digit counting means, wherein forming of said digit count checkword is verified by said output means.

49. A vital timer according to claim 46, wherein said checking means further comprises:

digit counting means for counting the number of times a complementary logic level appears upon said m-bit input port during the complementary scan of said n-bit output port, and means for forming a digit count checkword based on the count produced by said digit counting means, wherein forming of said digit count checkword is verified by said output means.

50. A vital timer for producing a predetermined output at the expiration of a selected time interval, comprising:

data generation means for producing at least one time data word representative of said selected time interval;

processing means coupled to said data generation means for determining the expiration of said selected time interval and thereupon producing said predetermined output, said processing means comprising, clock means for producing clock signals at a predetermined clock rate, counter means including at least one counting register coupled to said data generation means and loaded with said at least one time data word, said at least one counting register coupled to said clock means and counting said clock signals for said selected time interval whereupon said at least one register indicates the expiration of said selected time interval, checking means for monitoring said data generation means and said counter means and for producing plural predetermined checkwords indicative of failure-free production of said time data word by said data generation means and failure-free counting of said clock signals by said counter means, output means coupled to said checking means and said vital counter means for producing said predetermined output at the end of counting of said clock signals for said selected time interval, including means for verifying the production of said plural checkwords and for producing said predetermined output at the end of said selected time interval only upon verification of error free production of each of said checkwords;

wherein said checking means comprises:

memory means for storing each checkword upon formation thereof, said memory means coupled to said output means and providing said checkwords for verification upon expiration of said selected time period, a table memory for storing plural preprogrammed dummy words, means for clearing said memory means upon initiation of the generation of said predetermined time interval, means for fetching said dummy words from said table memory and temporarily loading said dummy words in said memory means after clearing of said memory means;

means for reading the contents of said memory means and forming the sum of said dummy words stored in said memory means after loading of said dummy words in said memory means; and means for forming a memory sum checkword based on the sum of the dummy words temporarily loaded into the memory means, said memory sum checkword then stored in said memory means and verified by said output means.

51. A vital timer according to claim 50, wherein said checking means comprises:

auxiliary clock means for generating auxiliary clock signals, memory check counting means clocked by said auxiliary clock means for measuring the amount of time taken to form said memory sum checkword, and means for forming a memory time checkword based on time taken to form said memory sum checkword, said memory time checkword stored in said memory means and verified by said output means.

52. A vital timer for producing a predetermined output at the expiration of a selected time interval, comprising:

data generation means for producing at least one time data word representative of said selected time interval;

processing means coupled to said data generation means for determining the expiration of said selected time interval and thereupon producing said predetermined output, said processing means comprising, clock means for producing clock signals at a predetermined clock rate, counter means including at least one counting register coupled to said data generation means and loaded with said at least one data word, said at least one counting register coupled to said clock means and counting said clock signals for said selected time interval whereupon said at least one register indicates the expiration of said selected time interval, checking means for monitoring said data generation means and said counter means and for producing plural predetermined checkwords indicative of failure-free production of said time data word by said data generation means and failure-free counting of said clock signals by said counter means, output means coupled to said checking means and said vital counter means for producing said predetermined output at the end of counting of said clock signals for said selected time interval, including means for verifying the production of said plural checkwords and for producing said predetermined output at the end of said selected time interval only upon verification of error free production of each of said checkwords;

wherein said checking means comprises, memory means for storing each checkword upon formation thereof, said memory means coupled to said output means and providing said checkwords for verification thereby, means for performing a cyclic redundancy check on the checkwords stored in said memory means, including means for forming a serial stream of bits derived from said checkwords and dividing said stream of bits by at least one preselected polynomial to produce at least one remainder word, and means for producing at least one signature checkword based on the at least one remainder word, wherein forming of said at least one signature checkword is verified by said output means.

53. A vital timer for producing a predetermined output at the expiration of a selected time interval, comprising:

data generation means for producing at least one time data word representative of said selected time interval;

processing means coupled to said data generation means for determining the expiration of said selected time interval and thereupon producing said predetermined output, said processing means comprising, clock means for producing clock signals at a predetermined clock rate, counter means including at least one counting register coupled to said data generation means and loaded with said at least one time data word, said at least one counting register coupled to said clock means and counting said clock signals for said selected time interval whereupon said at least one register indicates the expiration of said selected time interval, checking means for monitoring said data generation means and said counter means and for producing plural predetermined checkwords indicative of failure-free production of said time data word by said data generation means and failure-free counting of said clock signals by said counter means, output means coupled to said checking means and said vital counter means for producing said predetermined output at the end of counting of said clock signals for said selected time interval, including means for verifying the production of said plural checkwords and for producing said predetermined output at the end of said selected time interval only upon verification of error free production of each of said checkwords;

wherein said processing means comprises a microprocessor having a memory means for storing predetermined contents including predetermined subroutines and predetermined constants; and wherein said checking means comprises, means for performing a cyclic redundancy check on the predetermined contents stored in said memory means, including means for forming a serial stream of bits derived from said predetermined contents and dividing said stream of bits by at least one preselected polynominal to produce at least one remainder word, and means for producing at least one signature checkword based on the at least one remainder word, wherein forming of said at least one signature checkword is verified by said output means.

* * * * *